US008606233B2

(12) United States Patent
Brown et al.

(10) Patent No.: US 8,606,233 B2
(45) Date of Patent: *Dec. 10, 2013

(54) CONTENT-BASED PUBLICATION-SUBSCRIPTION SYSTEM FOR PRESENCE INFORMATION

(75) Inventors: Robert William Brown, Arnprior (CA);
Bruce Eric Buffam, Woodlawn (CA);
Connor Patrick O'Rourke, Kapala (CA)

(73) Assignee: BlackBerry Limited, Waterloo (CA)

( * ) Notice: Subject to any disclaimer, the term of this patent is extended or adjusted under 35 U.S.C. 154(b) by 576 days.

This patent is subject to a terminal disclaimer.

(21) Appl. No.: 12/619,080

(22) Filed: Nov. 16, 2009

(65) Prior Publication Data
US 2010/0216430 A1 Aug. 26, 2010

Related U.S. Application Data

(60) Provisional application No. 61/154,997, filed on Feb. 24, 2009.

(51) Int. Cl.
*H04M 1/66* (2006.01)

(52) U.S. Cl.
USPC ........ 455/411; 455/466; 455/434; 455/414.1; 455/435.1; 340/506; 340/531; 340/541; 709/227; 709/204

(58) Field of Classification Search
USPC ......... 709/203, 204, 206, 217, 219, 227, 201; 455/412.1, 412.2, 414.1, 414.3, 455/418–420, 435.1, 456.1–457, 466, 517, 455/518, 556.2
See application file for complete search history.

(56) References Cited

U.S. PATENT DOCUMENTS

| | | | |
|---|---|---|---|
| 6,016,478 A | 1/2000 | Zhang et al. | |
| 6,327,533 B1 | 12/2001 | Chou | |
| 6,442,263 B1 | 8/2002 | Beaton et al. | |
| 6,542,075 B2 | 4/2003 | Barker et al. | |
| 6,587,835 B1 * | 7/2003 | Treyz et al. | 705/14.64 |
| 6,643,701 B1 | 11/2003 | Aziz et al. | |
| 6,716,101 B1 | 4/2004 | Meadows et al. | |
| 6,789,078 B2 | 9/2004 | Saitou et al. | |
| 7,035,923 B1 * | 4/2006 | Yoakum et al. | 709/224 |
| 7,246,099 B2 | 7/2007 | Feldhahn | |
| 7,284,033 B2 | 10/2007 | Jhanji | |

(Continued)

FOREIGN PATENT DOCUMENTS

| | | |
|---|---|---|
| EP | 1 753 199 A1 | 2/2007 |
| WO | 02/25403 | 3/2002 |

(Continued)

OTHER PUBLICATIONS

"Content-Based Routing for Publish-Subscribe on a Dynamic Topology: Concepts, Protocols, and Evaluation" Gianpaolo Cugola, Davide Frey, Amy L. Murphy, Gian Pietro Picco.

(Continued)

*Primary Examiner* — Mahendra Patel
(74) *Attorney, Agent, or Firm* — Jones Day

(57) ABSTRACT

A method for content-based presence communication entails receiving presence information, storing the presence information in any arbitrary data format, validating a subscription request to subscribe to the presence information by determining if information contained within the subscription request represents an authorized subscription relationship, and communicating the presence information when the presence information matches the subscription expression.

8 Claims, 36 Drawing Sheets

(56) References Cited

U.S. PATENT DOCUMENTS

| | | | |
|---|---|---|---|
| 7,386,878 B2* | 6/2008 | Fernando et al. | 726/3 |
| 7,505,786 B2* | 3/2009 | Wennberg et al. | 455/558 |
| 7,677,436 B2 | 3/2010 | Ohno et al. | |
| 7,890,572 B2* | 2/2011 | Goodman et al. | 709/203 |
| 8,032,932 B2 | 10/2011 | Speyer et al. | |
| 8,060,572 B2 | 11/2011 | Brown et al. | |
| 8,146,142 B2 | 3/2012 | Lortz et al. | |
| 2002/0087892 A1 | 7/2002 | Imazu | |
| 2003/0037103 A1* | 2/2003 | Salmi et al. | 709/203 |
| 2004/0128151 A1 | 7/2004 | Mock et al. | |
| 2004/0267625 A1 | 12/2004 | Feng et al. | |
| 2005/0021773 A1* | 1/2005 | Shiga et al. | 709/228 |
| 2006/0047782 A1 | 3/2006 | Niemi | |
| 2006/0120281 A1 | 6/2006 | Schmidt et al. | |
| 2006/0146997 A1 | 7/2006 | Qian et al. | |
| 2007/0050840 A1 | 3/2007 | Grandcolas et al. | |
| 2007/0106698 A1 | 5/2007 | Elliott et al. | |
| 2007/0136197 A1 | 6/2007 | Morris | |
| 2007/0136800 A1 | 6/2007 | Chan et al. | |
| 2007/0182541 A1 | 8/2007 | Harris et al. | |
| 2008/0028211 A1 | 1/2008 | Tanizawa | |
| 2008/0089488 A1* | 4/2008 | Brunson et al. | 379/88.12 |
| 2008/0108332 A1 | 5/2008 | Tian et al. | |
| 2008/0205655 A1 | 8/2008 | Wilkins et al. | |
| 2008/0208953 A1 | 8/2008 | Tian | |
| 2008/0235230 A1* | 9/2008 | Maes | 707/9 |
| 2008/0285542 A1* | 11/2008 | Jachner | 370/351 |
| 2009/0010163 A1 | 1/2009 | Isomura et al. | |
| 2009/0022286 A1 | 1/2009 | Brunson et al. | |
| 2009/0022287 A1 | 1/2009 | Brunson et al. | |
| 2009/0022288 A1 | 1/2009 | Brunson et al. | |
| 2009/0022289 A1 | 1/2009 | Brunson et al. | |
| 2009/0028303 A1 | 1/2009 | Brunson et al. | |
| 2009/0049149 A1 | 2/2009 | Cheah | |
| 2009/0049190 A1 | 2/2009 | Jiang et al. | |
| 2009/0063643 A1 | 3/2009 | Setiawan et al. | |
| 2009/0063676 A1 | 3/2009 | Oh et al. | |
| 2009/0066510 A1 | 3/2009 | Kamdar et al. | |
| 2009/0070410 A1 | 3/2009 | Gilfix et al. | |
| 2009/0070419 A1 | 3/2009 | Gilfix et al. | |
| 2009/0077584 A1 | 3/2009 | Glasgow et al. | |
| 2009/0300095 A1* | 12/2009 | Bouchard et al. | 709/203 |
| 2010/0030643 A1* | 2/2010 | Sion | 705/14.49 |

FOREIGN PATENT DOCUMENTS

| | | |
|---|---|---|
| WO | 02/25403 A2 | 3/2002 |
| WO | 2006072817 A1 | 7/2006 |
| WO | 2007061946 A2 | 5/2007 |
| WO | 2008/020705 A1 | 2/2008 |
| WO | 2008073009 A1 | 6/2008 |
| WO | WO 2008073009 A1 * | 6/2008 |
| WO | 2008/120901 A1 | 10/2008 |
| WO | 2008/152586 A2 | 12/2008 |

OTHER PUBLICATIONS

"Efficient Content-Based Event Dispatching in the Presence of Topological Reconfiguration" Gianpaolo Cugola, Amy L. Murphy (2003) in Proceedings of the 23rd International Conference on Distributed Computing Systems (ICDCS03).

"Semi-Probabilistic Content-Based Publish-Subscribe" Paolo Costa, Gian Pietro Picco (2005) in Proceedings of the 25th International Conference on Distributed Computing Systems (ICDCS05).

"Bloom Filter Based Routing for Content-Based Publish/Subscribe" Zbigniew Jerzak et al. (2008) in Proceedings of the 2nd International Conference no Distributed Event-Based Systems—Rome, Italy.

"Scalable Security and Accounting Services for content-based Publish/Subscribe Systems" Himanshi Khurana, Radostina Koleva (2005) in Proceedings Symposium on Applied Computing.

"Achieving Scalability and Expressiveness in an Internet-Scale Event Notification Service" Antonio Carzaniga (2000) in Proceedings of the 19th Annual ACM Symposium on Principles of Distributed Computing.

"Content-Based Networking: A New Communication Infrastructure" Antonio Carzaniga, Er L. Wolf (2001) in NSF Workshop on an Infrastructure for Mobile and Wireless Systems.

"Publish/Subscribe Tree Construction in Wireless Ad-Hoc Networks" Yongqiang Huang, Hector Garcia-Molina in 4th International Conference on Mobile Data Management (MDM 2003), vol. 2574 of LNCS.

"Content-Based Dispatching in a Mobile Environment" Gianpaolo Cugola, Elisabetta Di Nitto, Gian Pietro Picco in Proceedings of WSDAAL 2000.

"Minimizing the Reconfiguration Overhead in Content-Based Publish-Subscribe" Gianpaolo Cugola, Davide Frey, Amy L. Murphy, Gian Pietro Picco in Proceedings of the ACM Symposium on Applied Computing (SAC) 2004.

"Modelling the Communication Costs of Content-Based Routing: the Case of Subscription Forwarding" Stefano Castelli, Paolo Costa (2007) in Proceedings of the 1st International Conference on Distributed Event-Based Systems.

"HyperCBR: Large-Scale Content-Based Routing in Multidimensional Space" Stefano Castelli.

"Epidemic Algorithms for Reliable Content-Based Publish-Subscribe: an Evaluation" Paulo Costa, Matted Migliavacca, Gian Pietro Picco, Gianpaolo Cugola (2004) in Proceedings of the 24th International Conference no Distributed Computing Systems (ICDCSO4).

"Exactly-Once Delivery in a Content-Based Publish-Subscribe System" Sumeer Bhola, Robert Strom, Saurabh Bagchi, Yuanyuan Zhao, Joshua Auerbach (2002).

"Introducing Reliability in Content-Based Publish-Subscribe Through Epidemic Algorithms" Paolo Costa, Matted Migliavacca, Gian Pietro Picco, Gianpaolo Cugola (2003) in Proceedings of the 2nd International Workshop on Distributed Event-Based Systems.

"Self-Organized Publish/Subscribe" Michael A. Jaeger (2005) in Proceedings of the 2nd International Doctoral Symposium on Middleware (DSM05).

"A Review of the Diffie-Hellman Algorithm and its Use in Secure Internet Protocols" SANS Institute InfoSec Reading Room, 2001-11-05, XP002575072, Retrieved from the Internet:URL:http://www.sans.org/reading_roorn/whitepapers/vpns/a_review_of_the_diffiehellman_algorithm_and_its_use_in_secure_internet_protocols_751> [Retrieved on Mar. 25, 2010], the whole document is relevant.

EPO: Communication pursuant to Article 94(3) EPC, Application No. 09 176 033.0-2413, Apr. 13, 2011 (5 pages).

USPTO: Office Action dated Oct. 11, 2011 in U.S. Appl. No. 12/618,912 (30 pages).

EPO: Communication pursuant to Article 94(3) EPC, Application No. 09 176 032.2-2413, Jul. 28, 2011 (5 pages).

EPO: Extended European Search Report, Application No. 09176032.2-2413, Jul. 7, 2010 (6 pages).

EPO: Extended European Search Report, Application No. 09176033.0-2413, May 10, 2010 (6 pages).

EPO: Communication pursuant to Article 94(3) EPC, Application No. 09 176 033.0-2413, Oct. 12, 2010 (4 pages).

Prati L et al.: "XDMS-Network Address Book enabler" IP Multimedia Subsystem Architecture and Applications, 2007 International Conference on, IEEE, Piscataway, NJ, USA, Dec. 6, 2007, pp. 1-4, XP031283339 ISBN: 978-1-4244-2671-3.

EPO: Extended European Search Report, Application No. 09176035.5-2413, Jul. 12, 1010 (6 pages).

EPO: Communication pursuant to Article 94(3) EPC, Application No. 09 176 035.5-2413, Feb. 17, 2011 (4 pages).

CIPO: PCT Written Opinion of the International Searching Authority with International Search Report, Application PCT/CA2010/000177, May 5, 2010 (8 pages).

Peterson et al.: "Enhancements for Authentication Identity Management in the Session Initiation Protocol (SIP)", IETF Network Working Group RFC 4474, Aug. 2006 (34 pages).

EPO: Communication pursuant to Article 94(3) EPC, Application No. 09 176 034.8-2413, Nov. 21, 2011 (5 pages).

(56) References Cited

OTHER PUBLICATIONS

CIPO: Requisition by the Examiner (office action) dated Jan. 24, 2012 for Application No. 2,692,747 (3 pages).
CIPO: Requisition by the Examiner (office action) dated Apr. 16, 2012 for Application No. 2,692,755 (3 pages).
USPTO: Office Action dated Mar. 20, 2012 for U.S. Appl. No. 12/618,875 (41 pages).
USPTO: Office Action dated Jun. 14, 2012 for U.S. Appl. No. 12/618,912 with Notice of References Cited (14 pages).
CIPO: Office Action dated Oct. 16, 2013 for Application No. 2,692,755 (4 pages).

* cited by examiner

CONTENT-BASED PUBLICATION-SUBSCRIPTION SYSTEM FOR PRESENCE INFORMATION

CROSS-REFERENCE TO RELATED APPLICATIONS

This application claims priority from U.S. Provisional Patent Application Ser. No. 61/154,997 entitled METHOD AND SYSTEM FOR COLLECTING, MANAGING AND DISSEMINATING PRESENCE INFORMATION, which was filed Feb. 24, 2009.

TECHNICAL FIELD

The present technology relates generally to telecommunications and, in particular, to the collection, management and dissemination of presence information.

BACKGROUND

In telecommunications, presence information has traditionally been used to indicate the ability, availability and willingness of a person to communicate. More generally, a person's presence information provides contextual information to let others know something about the present context of the person.

Presence is currently one of the key drivers behind instant messaging (IM) and some of the recent developments in VoIP technology, in particular Session Initiation Protocol (SIP). While these and other rudimentary presence technologies have been implemented and discussed (see, e.g., the IETF's RFC 2778 entitled "A Model for Presence and Instant Messaging" and RFC 4480 entitled "RPID: Rich Presence Extensions to the Presence Information Data Format (PIDF)"), these technologies are still generally quite embryonic. These prior-art technologies provide limited flexibility, scalability, security and privacy. Accordingly, improvements in the manner in which presence information is collected, managed and disseminated remain highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
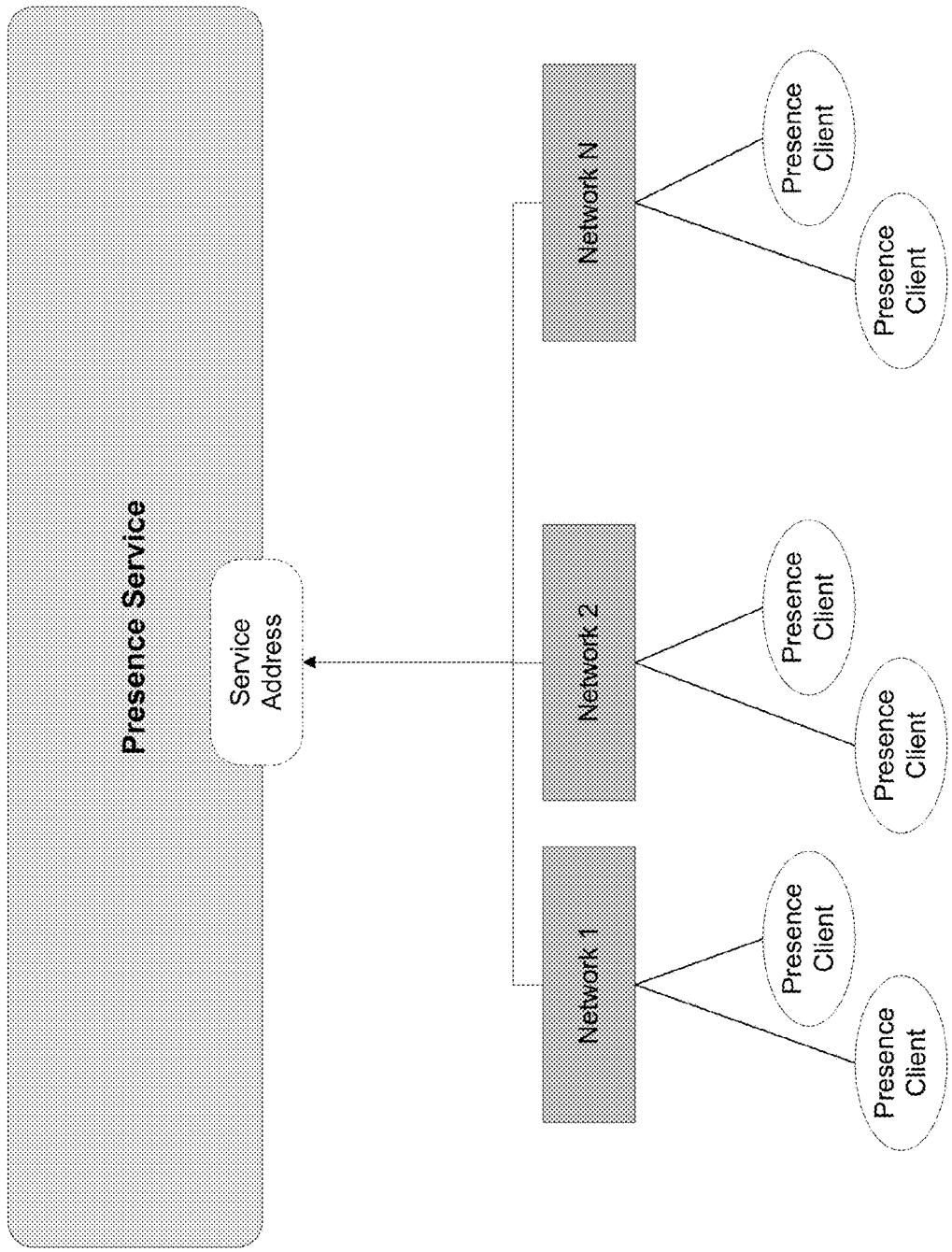
FIG. 1 schematically depicts, by way of general introduction, a presence service overlay connected to several different networks in accordance with various implementations of the present technology.

In general, the present technology disclosed herein provides an innovative presence system and related methods for collecting, managing and disseminating presence information. This novel presence technology is built around a content-based presence service as opposed to one that depends on pre-arranged data formats. This novel content-based presence service enables data content representing presence information to be published and stored in any arbitrary data format. Authorized watchers can thus subscribe to the presence information, or to specific elements of the presence information ("attributes" such as location, mood, activity, availability, etc.) by simply specifying subscription expressions in terms of content. For example, a subscription expression <Contact1, location="Ottawa") would notify the user when Contact1 is located in Ottawa. This content-based approach to presence enables data content to be published in any format and enables subscriptions to be defined in terms of the content that is sought or desired. Client applications that contribute or consume presence information can be utilized and updated without having to ensure interoperability of data formats. As such, this novel presence service is highly flexible, scalable and allows highly nuanced presence information to be published or sought.

In one main implementation, the presence service has, at its core, a content-based publish-subscribe subsystem for publishing data representing presence information in any arbitrary data format. An authorized contact, or watcher, can subscribe to presence information by specifying data content of interest in the form of subscription expressions that are also purely defined in terms of the content, i.e. independent of data format.

One main aspect of the present technology is a method for content-based presence communication. The method entails receiving presence, storing the presence information in any arbitrary data format, receiving a subscription request, the subscription request including a subscription expression; validating the subscription request by determining if information contained in the subscription request represents an authorized subscription relationship.

Another main aspect of the present technology is a computer-readable medium comprising code which when loaded into memory and executed on a processor of a computing device is adapted to perform acts of receiving presence information, storing the presence information in any arbitrary data format, receiving a subscription request, the subscription request including a subscription expression; validating the subscription request by determining if information contained in the subscription request represents an authorized subscription relationship, and communicating the presence information when the presence information matches the subscription expression.

Yet another main aspect of the present technology is a presence system for collecting, managing and disseminating presence information. The system includes a first device having a first presence client, a second device having a second presence client, a proxy node for routing a message relating to presence information from the first presence client to a predetermined function node to which the first presence client has already been bound, the function node processing the message from the first presence client to determine whether the message pertains to registration, publication or subscription, and a publish-subscribe subsystem connected to the function node for storing published data content and for comparing the published data content with one or more subscription expressions received from the second presence client, the publish-subscribe subsystem communicating presence information to the second presence client when the one or more subscription expressions matches the published data content.

Yet another main aspect of the present technology is a wireless communications device comprising a processor operatively coupled to a memory for executing a presence client that is programmed to publish presence information to a content-based presence service and to receive presence information notifications about other contacts from the content-based presence service when content-based subscription expressions sent by the wireless communications match data content published to the presence service by the other contacts.

Yet another main aspect of the present technology is a method of publishing presence information using a wireless communications device. The method involves collecting presence information, publishing data content representing presence information to a content-based presence service, the presence service storing the data content in any arbitrary data format, and authorizing a subscription to the presence information, allowing the data content to be communicated when a subscription expression matches the data content published to the presence service. The current time and/or current location may be used to determine or filter what presence information is collected or published.

Yet another main aspect of the present technology is a method of subscribing to presence information. The method involves communicating a subscription request to a content-based presence service, the subscription request being validated by the presence service by determining if information contained in the subscription request represents an authorized subscription relationship. The method also involves specifying a subscription expression defining data content that is of interest and then receiving presence information when the subscription expression matches the data content published to the presence service. The current time and/or current location may be used to determine or filter when a subscription request is sent or how the subscription is expressed.

The details and particulars of these aspects of the technology will now be described below, by way of example, with reference to the attached drawings.

FIG. 1 schematically depicts, by way of general introduction, a presence service overlay in accordance with various implementations of the present technology.

This novel presence system can be understood as a service overlay superimposed on a mobile network infrastructure and the Internet. In other words, the general architecture depicted in FIG. 1 supports access to the presence service through a mobile network infrastructure or through IP networks. The presence server is thus seen as a singular service entity by the presence clients. The system architecture is also readily scalable, and can support very large numbers of users.

The presence system is defined using a client-server style architecture in which presence clients produce and consume presence information. In general, and as will be elaborated below, presence information that is generated (collected and published) by one or more presentities may be consumed by one or more watchers. A user may be both a presentity and a watcher, or only one or the other. Mediating between presence clients is a presence server. This presence server receives, manages and disseminates the presence information.

The presence server uses a single global service identifier to simplify routing of data. For example, for certain types of wireless clients communicating through a mobile network infrastructure, the presence service has a single global service identifier (or service address). This approach simplifies routing of data and avoids coupling of the presence server with the mobile network infrastructure topology.

Still by way of introduction and overview, the presence server may be implemented as a tiered system made up of a proxy tier, a function tier and a persistence tier. This tiered structure of the presence server is transparent to presence clients. Presence clients may communicate with the presence server using a presence protocol.

For the purposes of this specification, the expression "presence information" refers to a set of information that conveys ability, availability, willingness for various modes of communication, e.g. e-mail, voice, short message service (SMS), multimedia message service (MMS), instant messaging (IM), for various services and various devices. Presence information usually contains specific, unambiguous states such as available/unavailable, current location, activity, holiday/working, sleeping/awake; however, it may also contain ambiguous, nuanced, subtle or qualitative information such as mood, interests, intentions, wishes, etc.

For the purposes of this specification, a "presentity" combines devices, services and personal information for a complete picture of a user's presence status.

Figure 2:
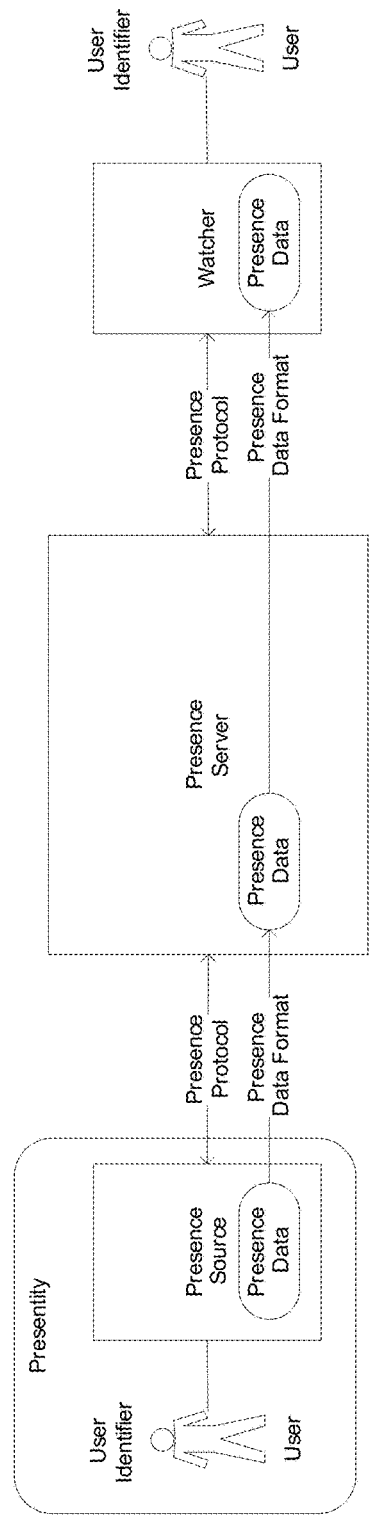
FIG. 2 schematically depicts the relationships among the basic elements of a presence system, namely the presentity (that is associated with a user), a watcher and a presence server that mediates between the presentity and the watcher.

FIG. 2 schematically depicts the relationship among the basic elements of the system, namely the user, presence server and presentity. As depicted schematically in this figure, the presentity includes a first user characterized by a first user identifier and a presence source (i.e. a first presence client) for generating presence data about the user. This presence data is communicated using a presence protocol to a presence server which, in turn, shares this presence data with a watcher (i.e. a second presence client associated with a second user). In this simple unilateral scenario, the first user is thus a supplier or provider of presence data while the second user (watcher) is a consumer (i.e. recipient, viewer) of the presence data. In a bilateral scenario, the first user would also receive presence data about the second user. The sharing of presence data may be symmetrical where both exchange the same types of presence data or asymmetrical where one user consumes more presence data than the other, or one user supplies more presence data than the other.

System Architecture and Presence Protocol

As noted above, the presence system is a service overlay superimposed on a mobile network infrastructure and/or the Internet. From the perspective of presence clients, the presence service appears as a singular server instance. The service can be identified by a single global service identifier on all instances of the mobile network infrastructure.

The presence protocol is an application protocol that can be transported over the existing network using a suitable transport protocol or wireless transport protocol. The presence protocol depends upon underlying transport layers such as TCP/IP only for basic message delivery services. It is not dependent upon the specifics of transport layer addressing, routing or network topologies.

As a consequence of the design of the system architecture and of the presence protocol, the presence system is decoupled from the network topology (e.g., the presence system is not coupled to any particular instance of a mobile network infrastructure). Furthermore, not only are system functions separate and independent from the applications, but also the applications themselves operate independently of one another. The architecture and protocol moreover enable the following: (i) flexible message routing as defined by the applications, (ii) enhancements and extensions without requiring upgrade or restart of the entire system, and (iii) the addition of individual components to implement new versions of the protocol independently.

A multitude of considerations have influenced and guided the design of the architecture and of the presence protocol such as, for example, having a well-defined protocol layering, and using version management (e.g. ensuring that each message identifies the version of the protocol with which it complies). Transport mapping was also another key consideration in the design the architecture and protocol. For example, the system is designed to map the presence protocol onto underlying network transports to provide basic message delivery services. The system is also designed to work with symmetric, Internet-style transports such as SCTP or SIP for server-server communication. Transaction support is another important consideration. For instance, messaging order can be achieved by implementing a sequence number (which enables local message order correction). The system may also use a transaction identifier to associate related requests and responses.

A further design consideration was to implement a message-based structure (e.g. datagrams for message-oriented communication, application multiplexing, user session multiplexing, application-specific protocol fields and data elements).

Yet a further consideration was network decoupling (i.e. applications and users named independently of underlying network addresses). For example, the transport protocol identifies devices and service whereas the presence protocol identifies users and sessions.

Still a further consideration was to make the system asynchronous and non-blocking. Accordingly, applications are independent of each other, users are independent of each other, and clients are independent of each other.

Security was also a key requirement for this novel system. The system does not reveal any information, such as authorization or filters, through response codes or other normal operations. A key management protocol may be used to ensure communication security between presence clients and the presence service so that presence data is shared in total privacy with only the intended recipient(s). User authentication ensures that only authorized clients are able to receive presence information. System security and user authentication will be described in greater detail below.

Figure 3:
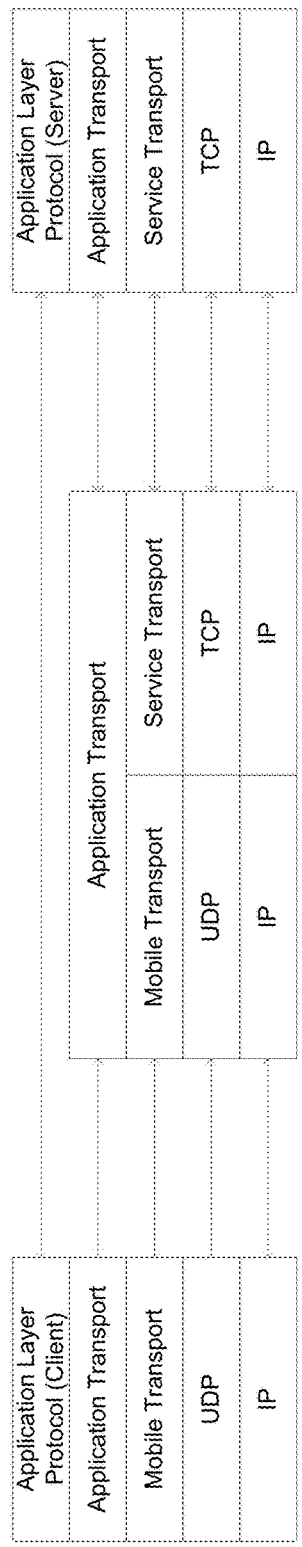
FIG. 3 is a generalized protocol stack diagram for a wireless client that can be used to implement the novel presence service disclosed herein.

Referring now to FIG. 3, the presence protocol is an application layer protocol transported by the transport layer. FIG. 3 shows an example of a protocol stack for a wireless client that can be used to implement the novel presence service disclosed herein. In this example, service transport is performed using TCP/IP whereas mobile transport uses UDP/IP. These protocols are disclosed solely by way of example to illustrate one main wireless implementation of this technology. Other protocols may be used or substituted, as would be understood by those of ordinary skill in the art.

Figure 4:
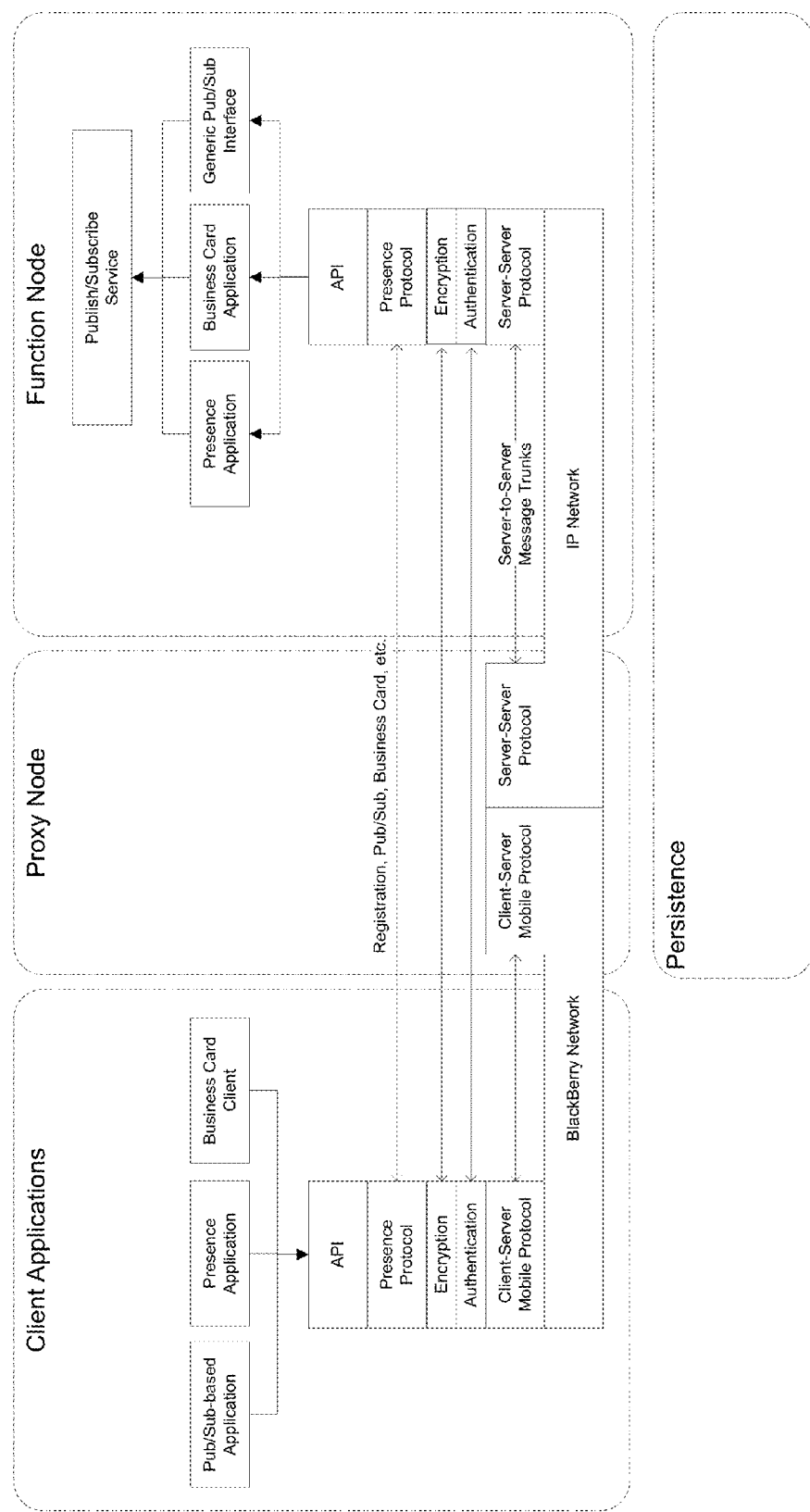
FIG. 4 presents a stack view showing how client applications may interact with a function node via a proxy node.

FIG. 4 provides a stack view of the protocols and applications that can be used to implement this novel presence system. This figure shows how the client applications (e.g. pub/sub-based application, presence application, business card application) interact with the function node via the proxy node. These three client applications are presented merely by way of example to illustrate how such applications interface via the presence protocol with respective applications at the function node.

Figure 5:
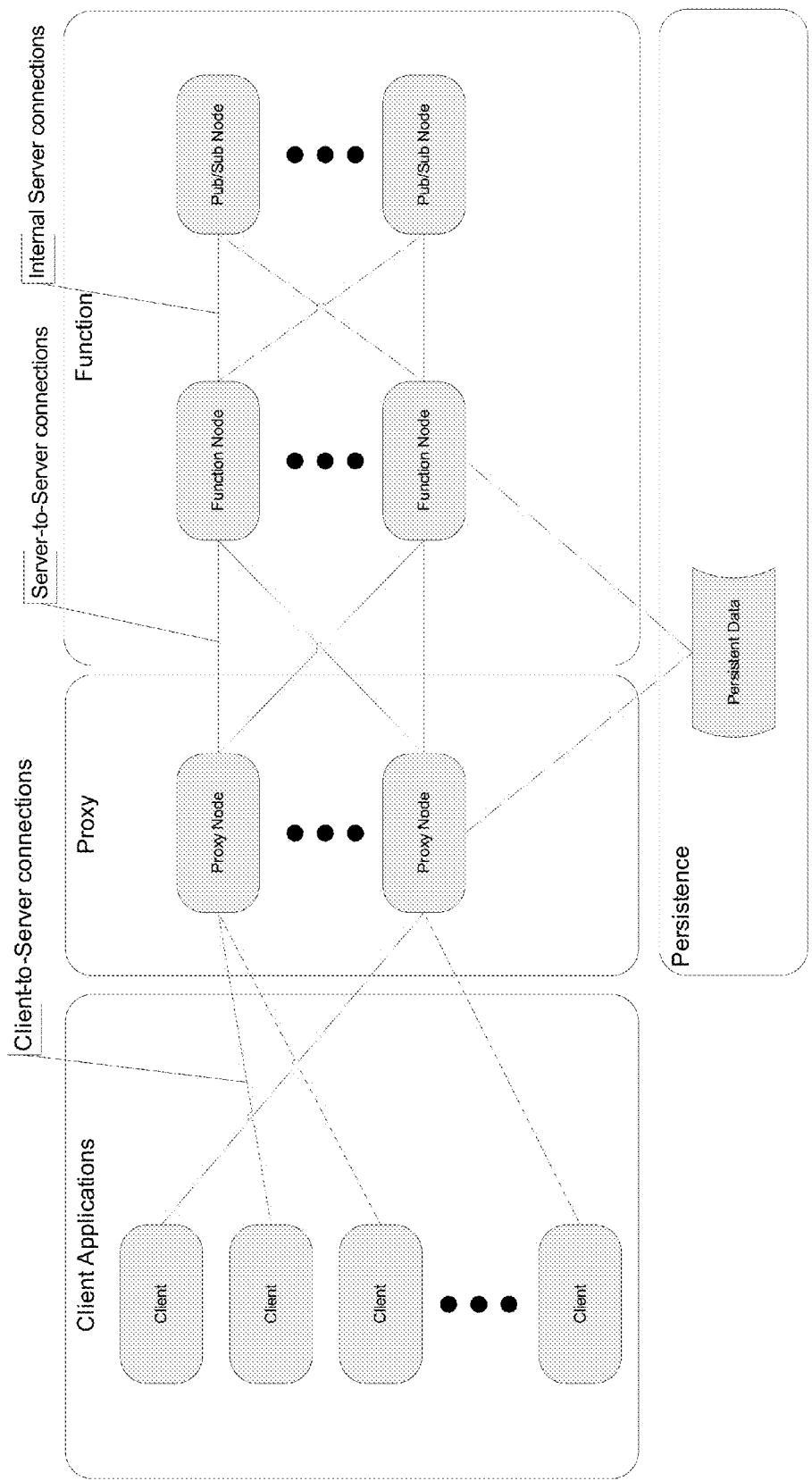
FIG. 5 is one example of a network topology that can be used to implement a presence system in accordance with the present technology.

FIG. 5 illustrates an example of a network topology that can be used to implement the novel presence system. In this example topology, each client connects to only one particular proxy node. Each proxy node is, in turn, connected to all of the function nodes, as depicted in this figure. The function nodes are also connected to every pub/sub node. The proxy nodes and function nodes may also be in communication with the persistent data store (persistence tier).

Figure 6:
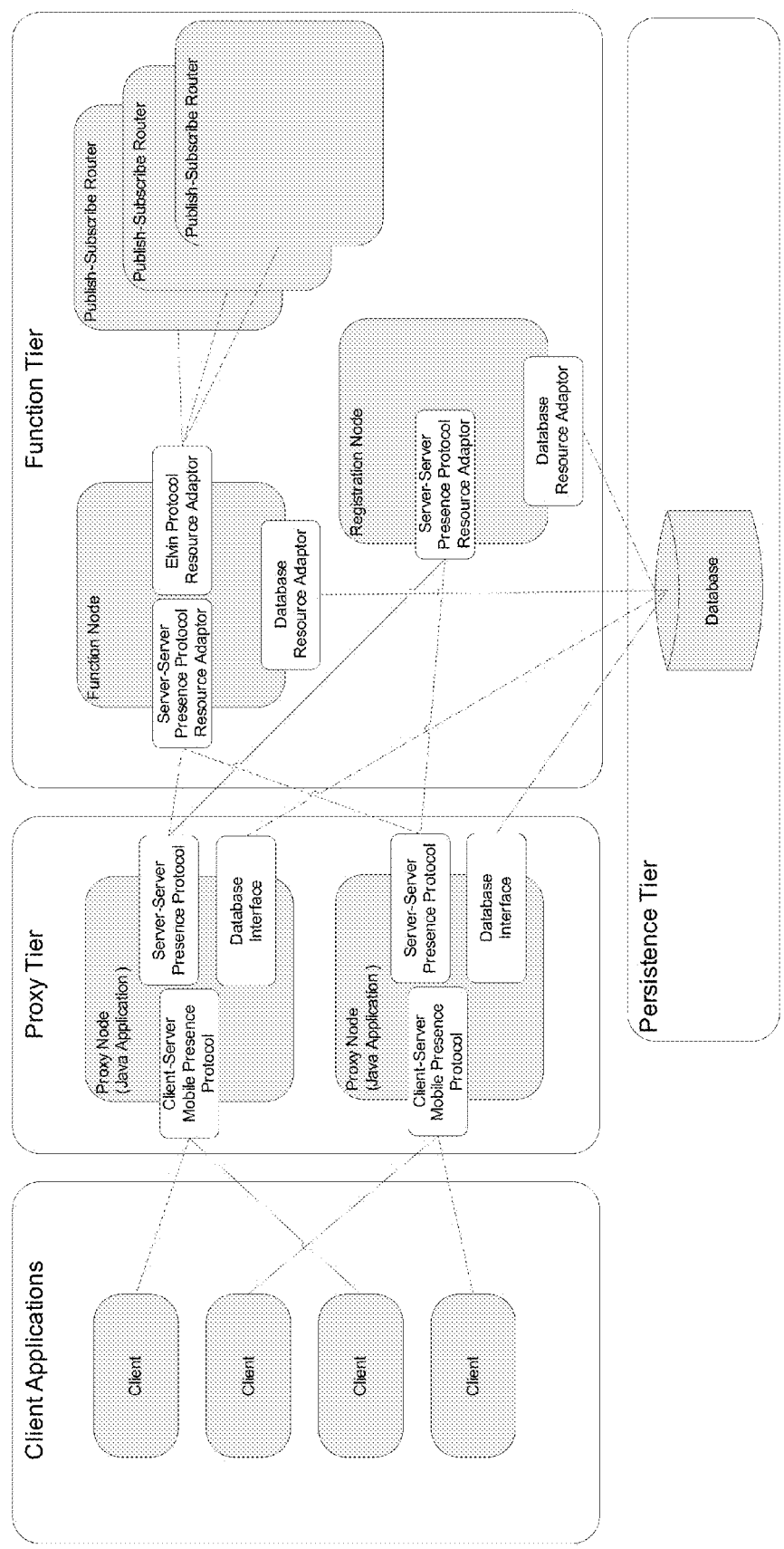
FIG. 6 presents a schematic view of one implementation of the presence system, depicting various interactions amongst the client applications, proxy tier, function tier and persistence tier.

FIG. 6 illustrates an example implementation of the architecture of the presence system. As depicted, each proxy node includes a database interface for communicating with the database in the persistence tier. Each proxy node comprises distinct interfaces (resource adaptors) for the client-server mobile presence protocol and the server-server presence protocol. As further depicted in FIG. 6, each function node includes a server-server presence protocol resource adaptor (for communicating with a counterpart server-server presence protocol resource adaptor at the proxy node), a database resource adaptor and a pub/sub protocol resource adaptor. As further illustrated in this figure, the registration node includes a server-server presence protocol resource adaptor (for communicating with a counterpart server-server presence protocol resource adaptor at the proxy node) as well as a database resource adaptor.

In the novel presence system, the client applications may be realized as Java applications running on a mobile device, although any other suitable programming language may be used. In addition to a presence client application, the client applications may include, for example, a distinct presence registration client application and a business card client application.

The proxy tier may also be realized as a Java application that executes on a set of servers known as proxy nodes which are connected to the infrastructure via a suitable transport protocol. These proxy nodes act as gateways which terminate the transport protocols and route presence protocol messages to their correct destinations.

Messages sent from a client to the presence service are routed by a proxy node to the appropriate node in the function tier based upon the identity of the client and the specific application identified in the message.

Messages sent from the presence service to a client are routed by a proxy node based upon the Universally Unique Identifier (UUID) contained in the message.

By way of example to illustrate one possible implementation of this technology, the function tier may be composed of a set of specialized application nodes:
  Registration Nodes
  Subscription/Notification Nodes
  Publication Nodes
  Peer-to-Peer Nodes
  Publication/Subscription ("Pub/Sub") Router Nodes The application nodes of the functional tier may be deployed on separate servers or together in various combinations or clusters depending upon any deployment requirements.

The persistence tier can be implemented, for example, as a database running on a server, a cluster of servers or a network of servers.

Figure 7:
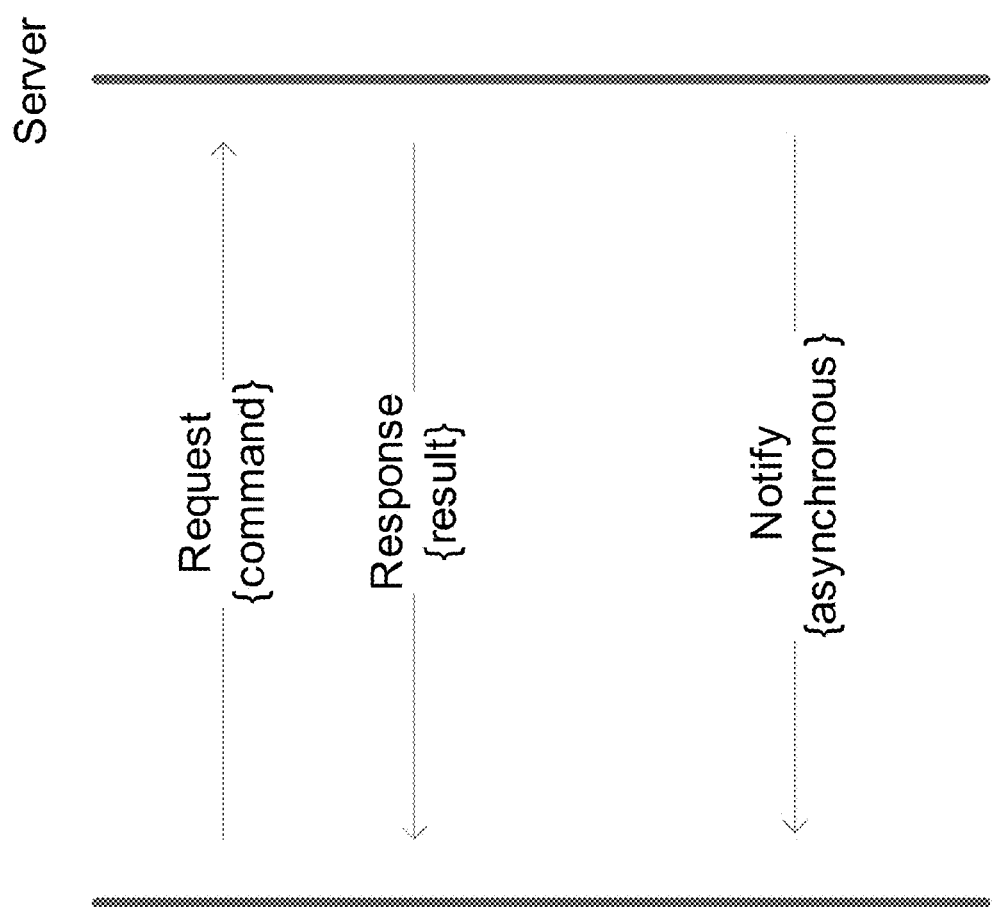
FIG. 7 is a high-level depiction of synchronous (request-response) and asynchronous message delivery paradigms which are both supported by the presence protocol.

The presence protocol supports request-response style (i.e. synchronous) message exchanges as well as asynchronous message delivery, which are depicted schematically in FIG. 7.

Applications such as registration, publication, subscription/notification and peer-to-peer communication are independent of each other within the presence protocol layer. In particular, routing of messages is independent and distinct for each application.

Figure 8:
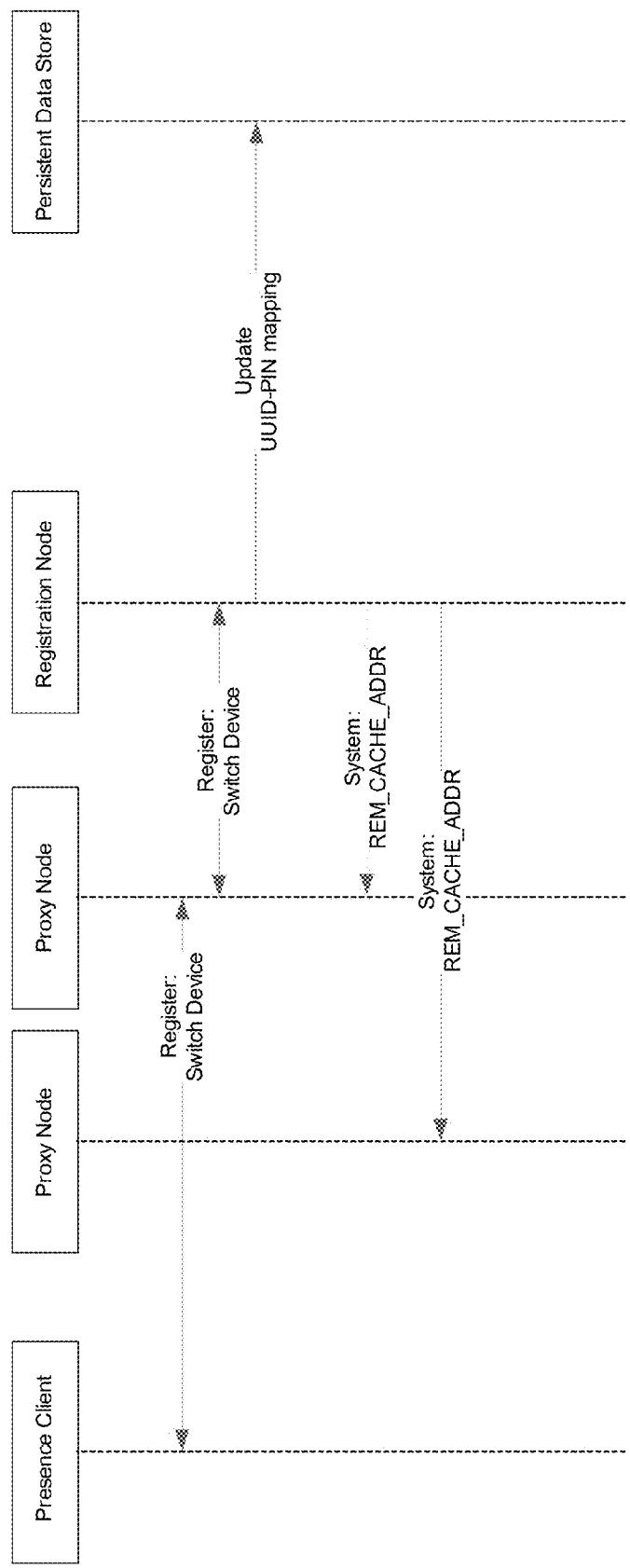
FIG. 8 schematically depicts an example of a system message sequence for registration of a new device whereby a mapping that links the user to his device is stored in the persistent data store.

In main implementations of this technology, different message categories are employed to identify messages related to different aspects of the presence service. FIG. 8 schematically depicts an example of a system message sequence. This figure illustrates the use of the system message category to manage cached UUID-mobile device identifier mappings. In this example, the user has switched mobile devices (presence client) causing the UUID-mobile device identifier mapping table maintained in the proxy node caches to become invalid. Upon completion of the switch device re-registration procedure, the registration node sends a system message to all proxy nodes instructing them to remove their cached entries for the UUID-mobile device identifier mapping if one exists.

The next time the presence service sends a message to the presence client the proxy node responsible for routing the message will retrieve the new UUID-mobile device identifier mapping from the persistent data store.

Figure 9:
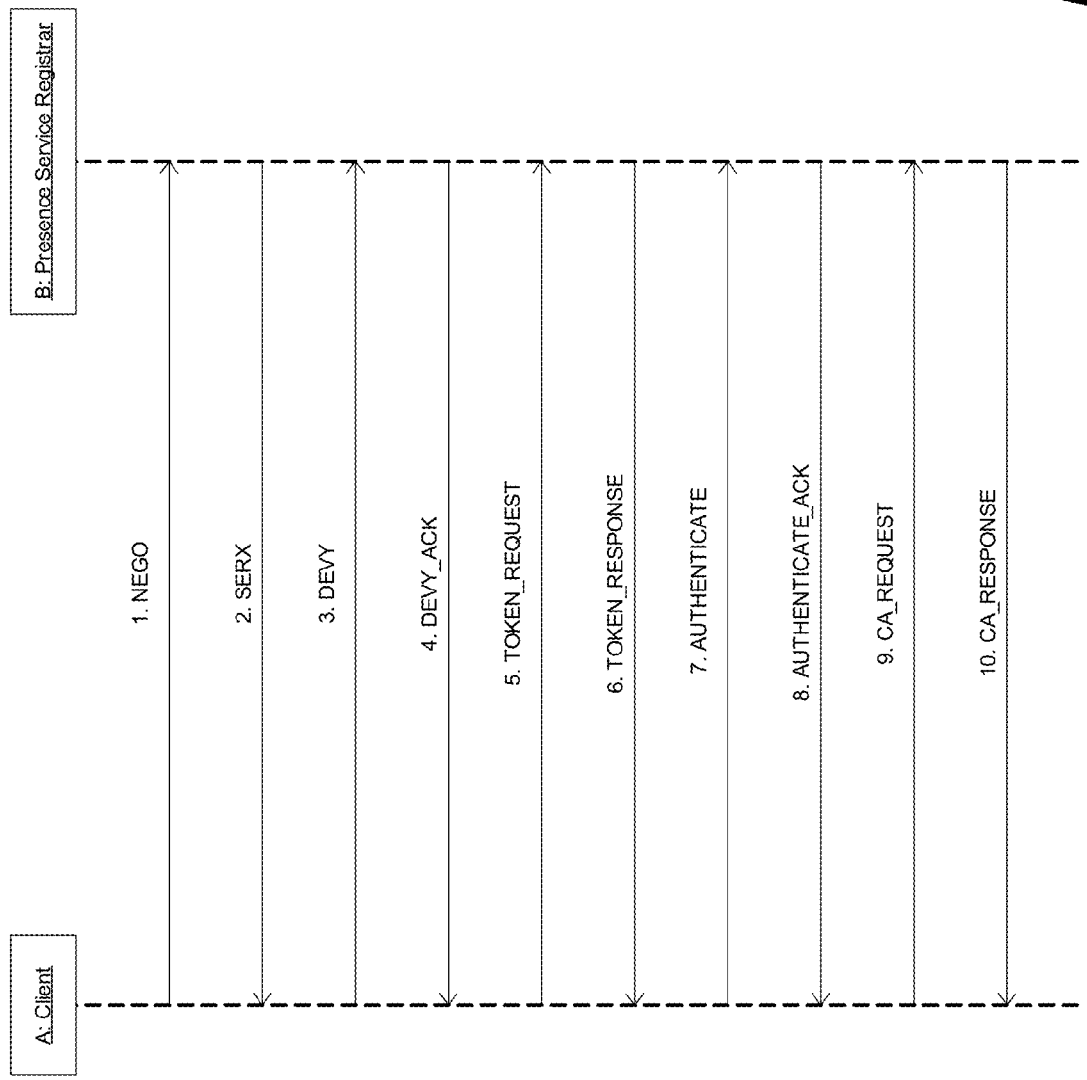
FIG. 9 schematically depicts an example of a registration message sequence between a presence client and a presence service registrar (registration node)

FIG. 9 schematically depicts an example of a registration message sequence. The registration message category may be used to identify messages related to user registration with the presence service. The sequence of messages exchanged between the client and the presence service registrar is illustrated in the sequence diagram shown in FIG. 9. Each message is identified through its abbreviated name. Registration is thus a synchronous process that involves the exchange of messages between a presence client and the presence service registrar or registration node. In most implementations, the messages are exchanged through a relay, to be described in greater detail below with regard to FIG. 15.

During registration, one message is sent via e-mail to the presence client to verify ownership of the selected user identifier e-mail address. In a specific implementation, this special e-mail message contains only an attachment with content type "application/x-rimdevice-MailAuthToken-authToken-.ext", for example. The attachment contains, in most implementations of this technology, an authentication token.

In one specific implementation, each registration message comprises an eight-byte fixed-length registration session identifier field followed by a single TLV command field where TLV refers to a command encoded using a Type-Length-Value format.

Peer-to-peer messages enable a presence client to communicate with another presence client via the presence system. The presence service mediates the communication, authenticates clients and routes messages between clients.

There are two basic scenarios for peer-to-peer communications. The first scenario is the most common in which the sending party knows the UUID (universally unique identifier) of the destination. In the second scenario the sending party does not yet know the UUID of the destination—only the email address of the destination is known.

Figure 10:
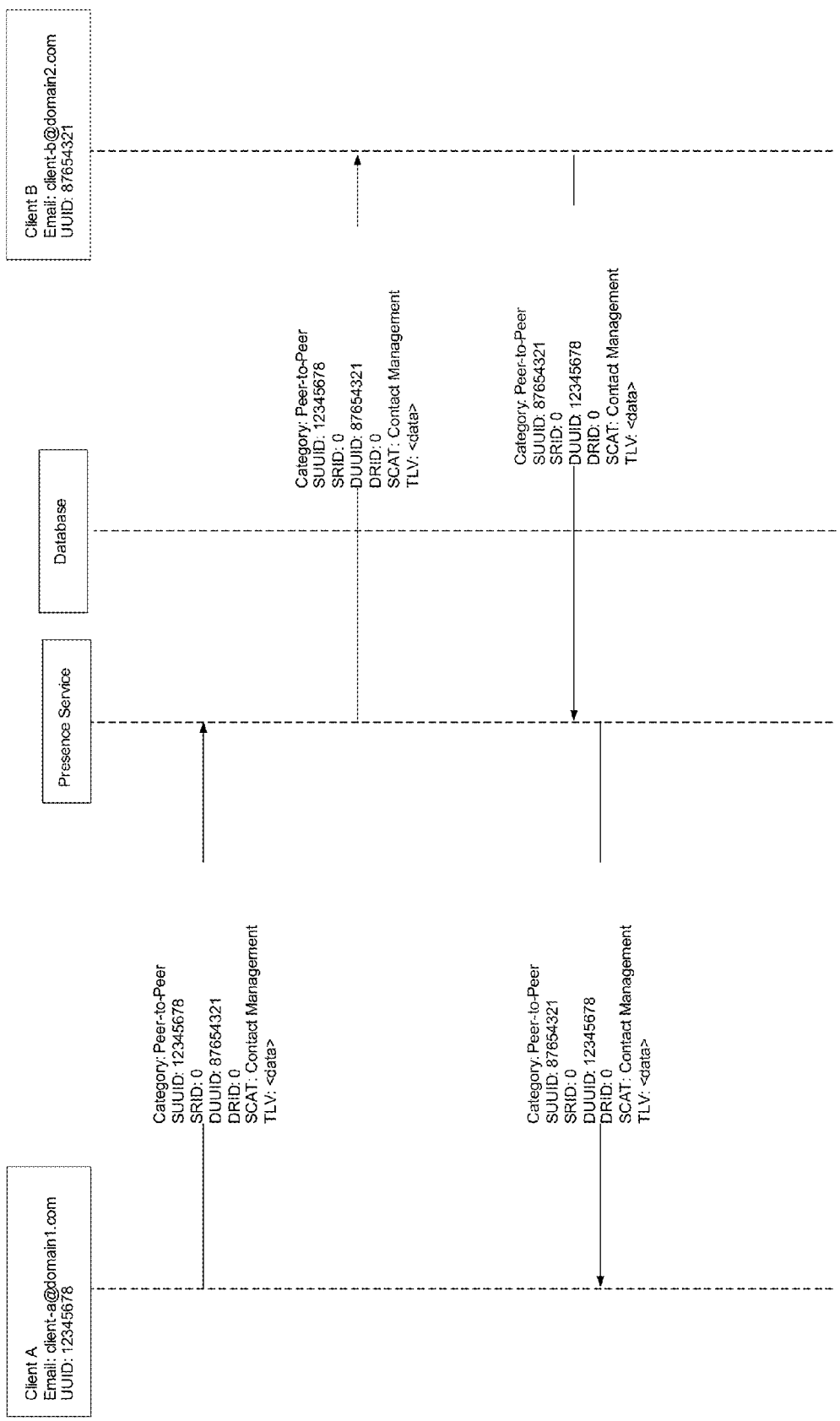
FIG. 10 schematically depicts a peer-to-peer message sequence for a known DUUID (i.e. the destination's universally unique ID)

In FIG. 10, Client A sends a peer-to-peer message with the DUUID field populated with UUID of Client B. The presence system inspects the DUUID and forwards the message to Client B.

Figure 11:
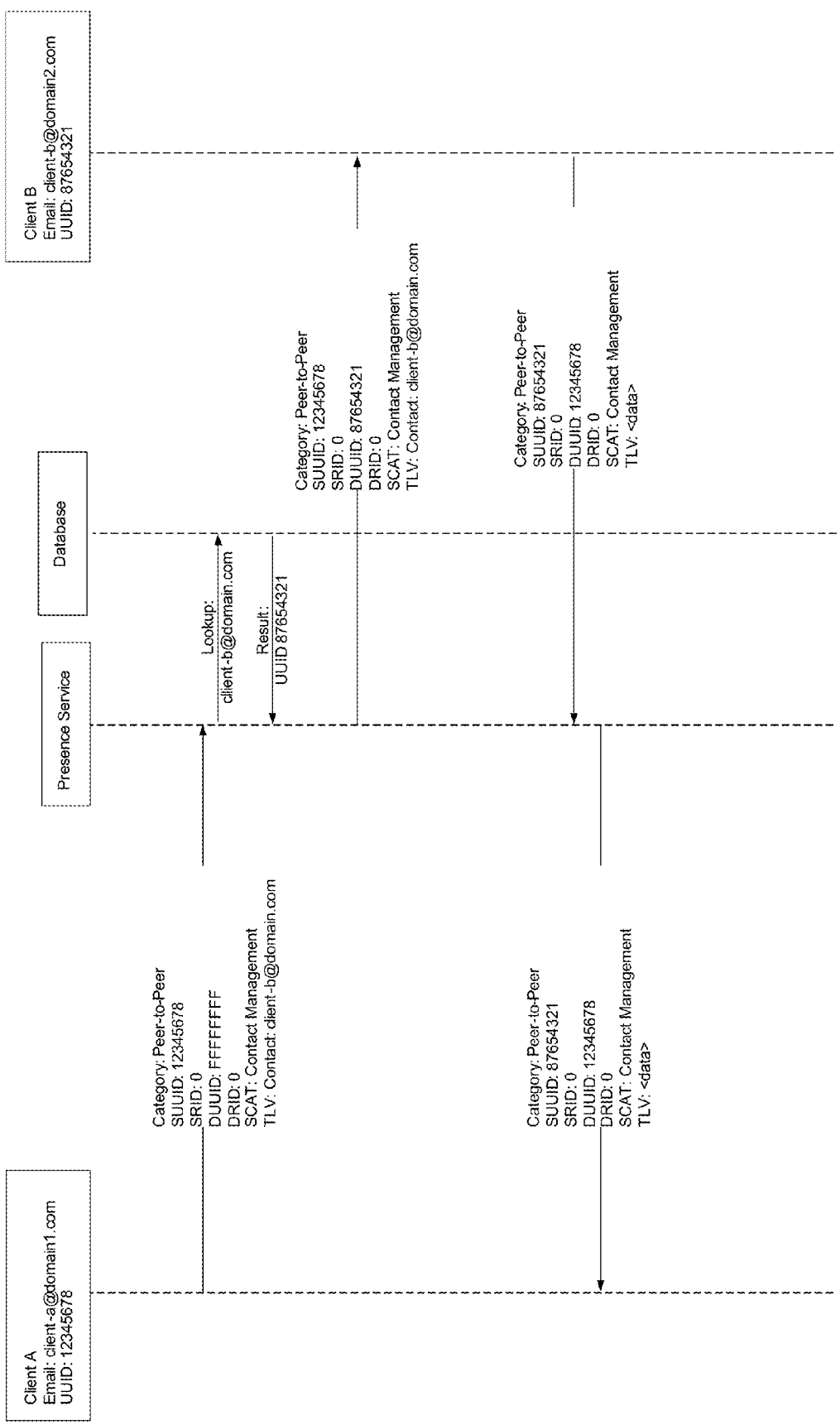
FIG. 11 schematically depicts a peer-to-peer message sequence for an unknown DUUID.

In FIG. 11, Client A sends a message to Client B. Client A knows only the email address identifier of Client B—Client A does not yet know the UUID of Client B. This would be the case if, for example, Client A and Client B have had no prior communication or exchange of UUIDs.

Client A populates the DUUID field with "all Fs" (or any other predetermined sequence of letters, numbers or symbols) to indicate to the Presence System that the UUID of the destination is unknown and that there is a TLV-encoded email address included for Client B.

The presence system performs a database lookup on the e-mail address to obtain the corresponding UUID for Client B. The DUUID field is then populated with the UUID of the destination (in this case Client B) and the message is forwarded to Client B.

Subscribing to Presence Information

The present technology enables a user ("watcher") to subscribe to presence information generated and published to the presence service by a presentity. With the presentity's authorization, the watcher thus establishes a subscription relationship with a presentity. This subscription relationship is consensual in the sense that the watcher may only receive presence information when allowed by the presentity that publishes the presence information. As will be elaborated below, the presentity may impose content-based conditions, time-based conditions, location-based conditions, or any other such conditions on the subscription so as to limit and control what information may be communicated and under what circumstances the information may be communicated. To establish an authorized subscription relationship between a presentity and a watcher, a subscription request is communicated by the would-be watcher to a content-based presence service. The subscription request is then validated by the presence service by determining if information contained in the subscription request represents an authorized subscription relationship, e.g. if the identity of the would-be watcher making the request and the type of information sought by the would-be watcher are accepted by, or acceptable to, the presentity that is of interest to the would-be watcher. In other words, an authorized subscription relationship is created when a presentity grants permission, however limited or contingent, to a watcher to access published data content representing the presence information. The method also involves specifying a subscription expression defining data content that is of interest to the second user (i.e. the watcher) and then receiving presence information about the first user (i.e. the presentity) when the subscription expression matches the data content published by the first user (the presentity) to the presence service. Publishing and/or watching may be accomplished using a wireless communications device. In that case, assuming the wireless communications device has a positioning-determining subsystem, e.g. a GPS chipset, the current time and/or current location of the wireless communications device may be used to determine or filter when a subscription request is sent or how the subscription is expressed. In other words, presence information may be collected based on a time condition and/or a location condition (e.g. only between 9 a.m. and 5 p.m. and provided that the location corresponds to London, England). Similarly, publication of any collected presence information may be controlled by time- and/or location-based criteria. Moreover, as mentioned above, the subscription may stipulate time- and/or location-based conditions that must be met before any presence information is disseminated to a watcher.

Figure 12:
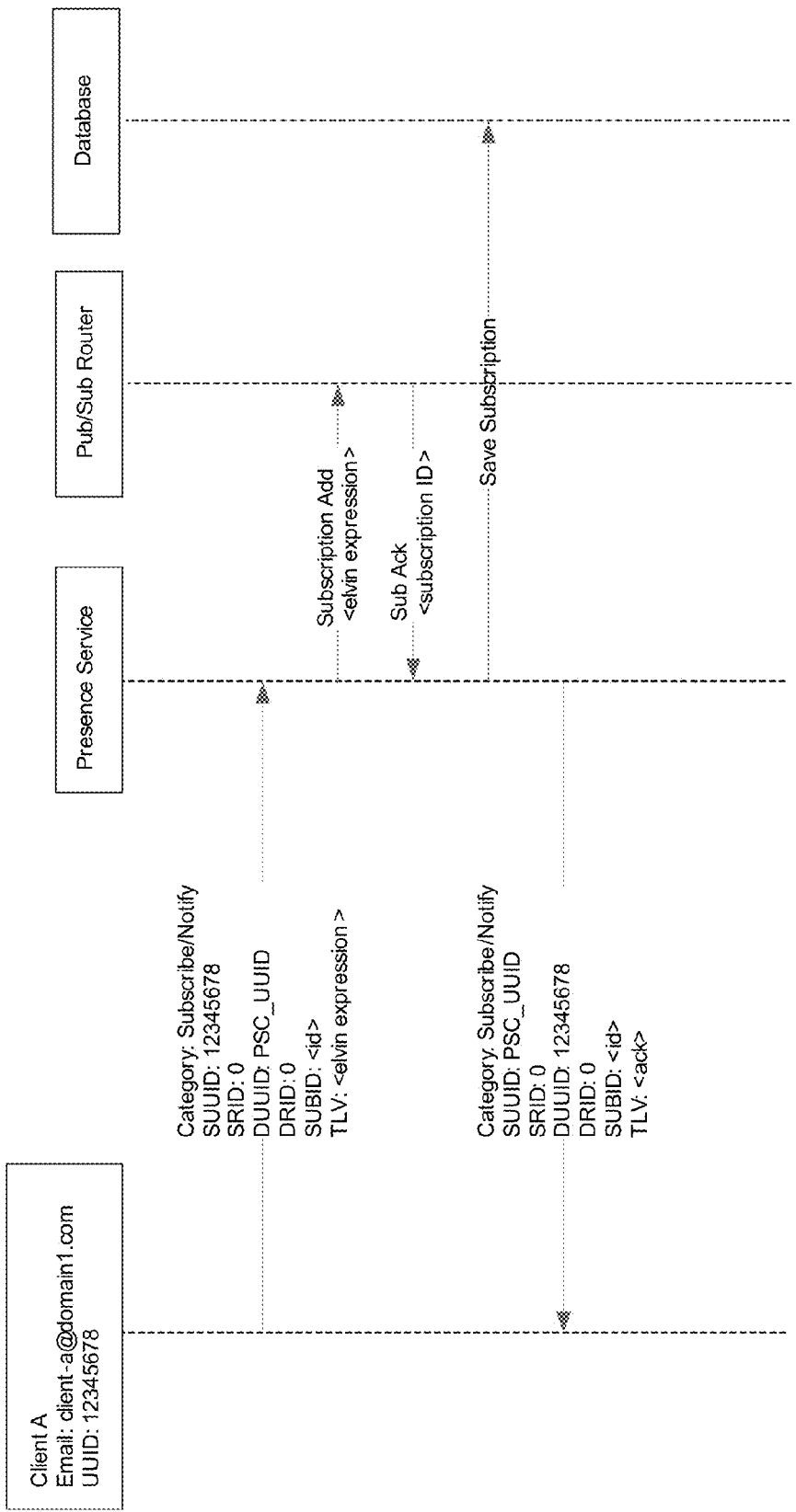
FIG. 12 schematically depicts a message sequence for subscribing to a presence service.

FIG. 12 schematically depicts a message sequence for subscribing. This figure illustrates the messages exchanged between a presence client and the presence server to add a subscription (i.e. create an authorized subscription relationship) so that the presence client will be notified of published data or events that are of interest to the presence client and for which the authorized subscription relationship permits access. The presence client expresses its interest using, for example, a subscription expression language. In general, clients register subscriptions with, or send notifications to, the server (i.e. to the publish-subscribe subsystem or "pub-sub core"). When the pub-sub core receives a notification, it forwards it to all clients whose subscriptions match that notification, i.e. to all clients who have expressed an interest (as defined by their respective subscription expressions) in the content of that notification. The subscription expressions can be cast in terms of names (i.e. data labels or data wrappers), operators (i.e. logical or Boolean operators), and literals (e.g. strings).

Figure 13:
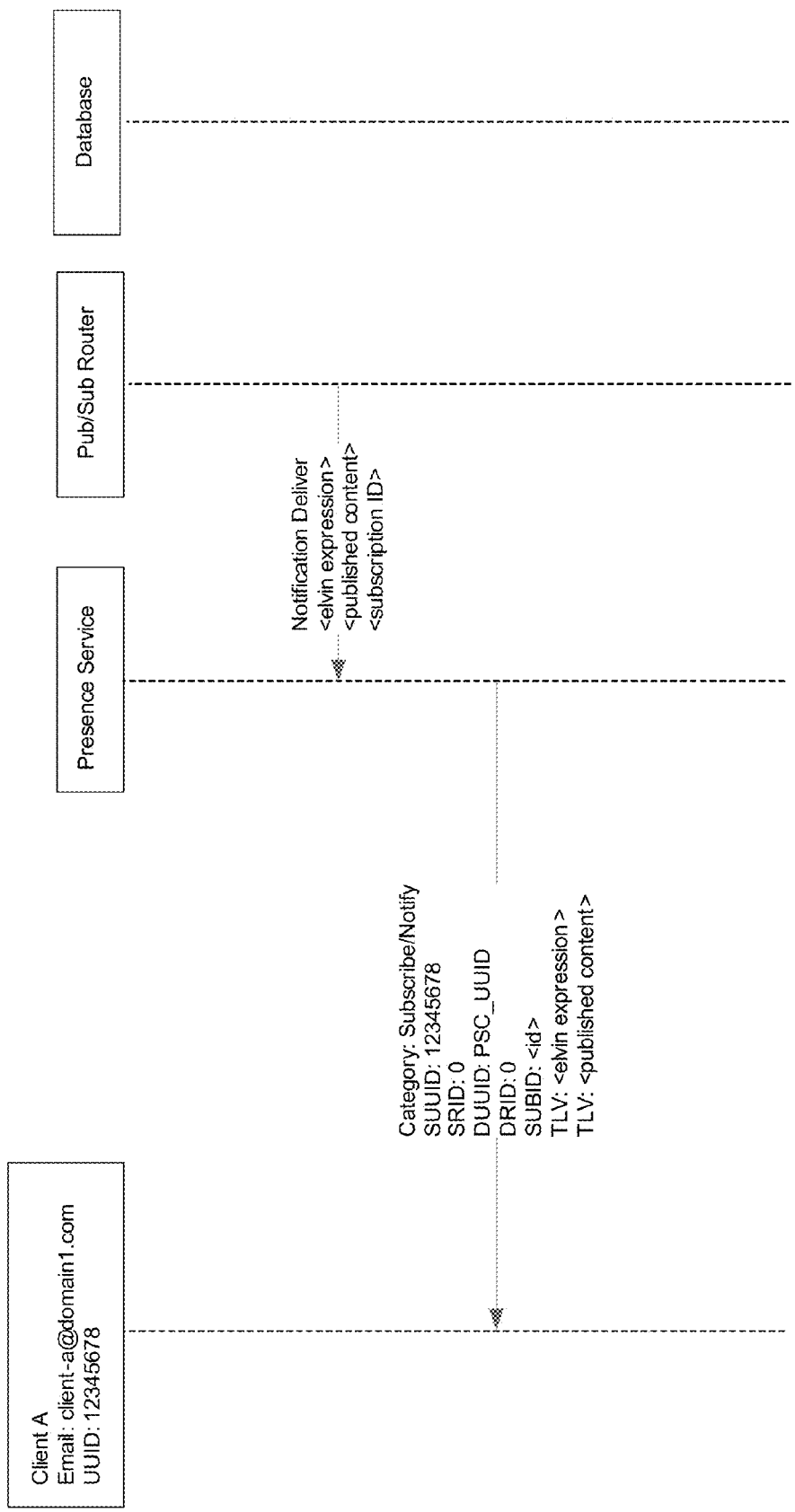
FIG. 13 schematically depicts a message sequence for notifying a watcher of presence information.

The presence server compares the subscription expression with data published by other sources in the future to determine whether there is a match. Whenever there is match with the subscription expression, the presence server sends a notification containing the matching data to the presence client as shown in FIG. 13.

Publishing Presence Information

The present technology enables presence information to be published using a computing device such as, for example, a wireless communications device. This involves collecting presence information, publishing data content representing presence information to a content-based presence service, the presence service storing the data content in any arbitrary data format, and authorizing an interested contact to subscribe to the presence information. The interested contact thereby becomes a watcher when the subscription is authorized. This watcher thus receives the published data content representing the presence information of the presentity of interest when a subscription expression specified by the watcher matches the data content published to the presence service by that presentity. Publication may be accomplished using a wireless communications device, which may include a position-determining subsystem such as, for example, a GPS chipset. In that case, the current time and/or current location of the wireless device may be used to determine or filter what presence information is collected and/or published.

Figure 14:
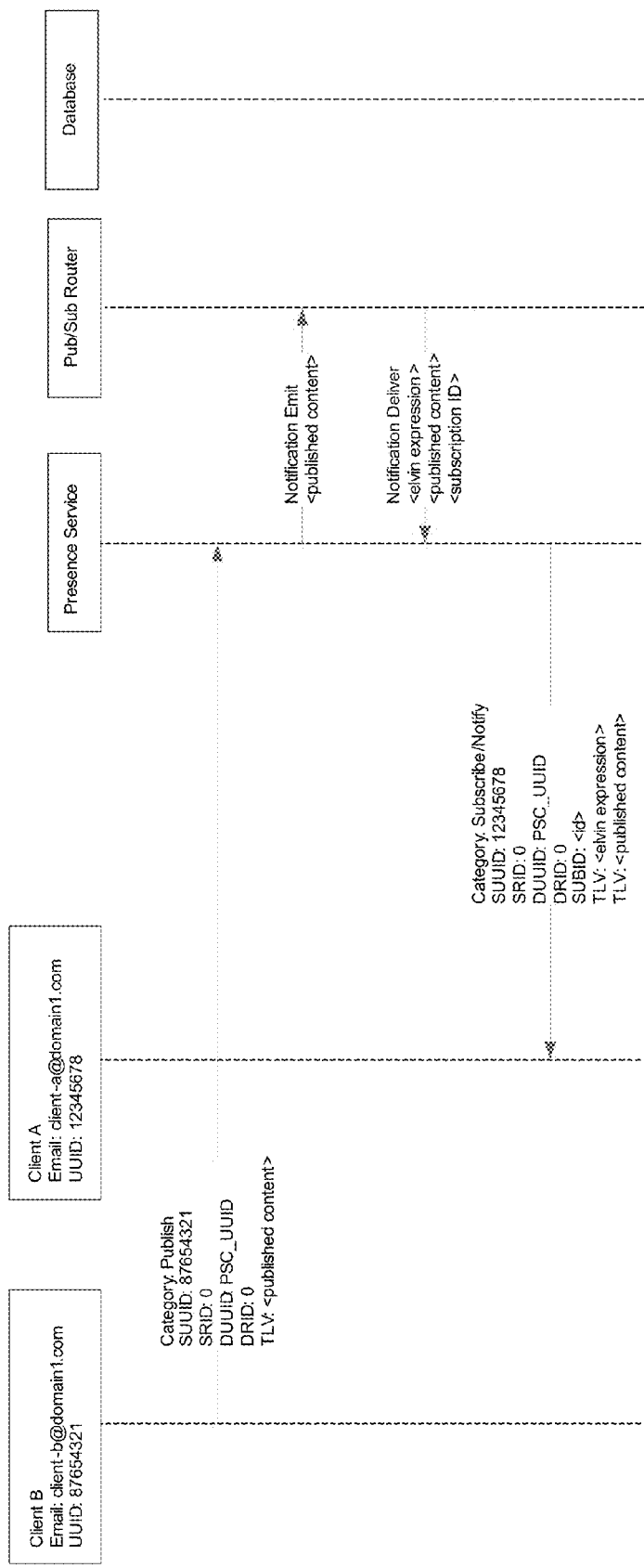
FIG. 14 schematically depicts a message sequence for publishing presence information.

FIG. 14 schematically depicts a message sequence for publishing. This figure illustrates the messages exchanged between a presence client and the presence server when publishing presence data. For completeness of the example, it is assumed that Client A has previously added a subscription as illustrated in FIG. 12.

The publish message sent to the presence server by Client B contains the data that is intended to be published. The presence service compares the published data with subscription expressions previously received from other clients with whom Client B has authorized subscription relationships. In this example, the published data matches a subscription expression and the presence server sends a notification containing the published data to Client A which created the matching subscription expression.

Registration

Figure 15:
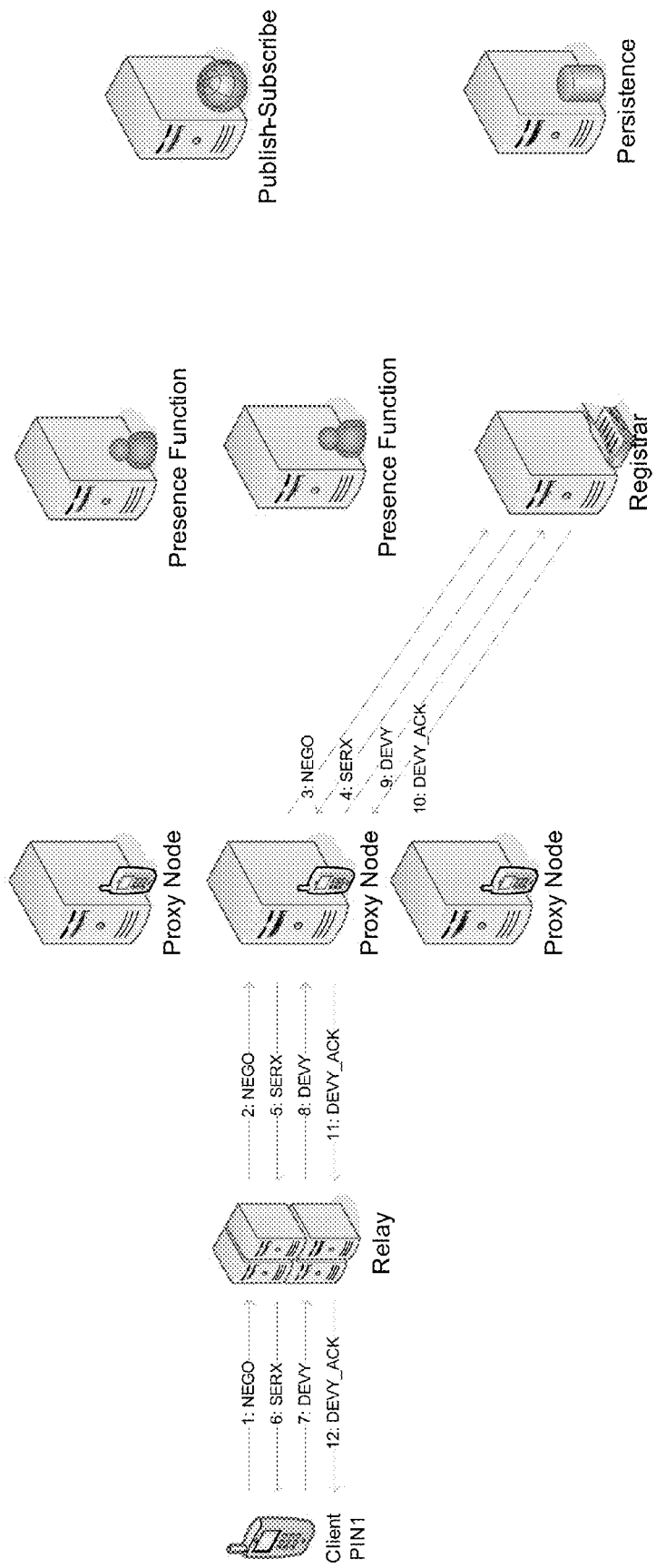
FIG. 15 schematically depicts a client-server key negotiation process as a first phase of the presence registration procedure.

FIG. 15 schematically depicts a client-server key negotiation as part of the presence registration procedure. This figure illustrates, by way of example, an initial key negotiation phase of the presence registration procedure. The presence client sends the first NEGO message inside a transport layer message addressed to the service identifier of the presence service. The mobile network infrastructure forwards this message to the service identifier of one of the proxy nodes. The selected proxy node removes the transport protocol headers, inspects the message category and forwards the message to a presence registrar (registration node). All subsequent messages related to the client registration session follow the same path between the presence client and the presence registrar.

Upon completion of the key negotiation phase, the presence client and the presence registrar will have established a trusted, encrypted communications channel. This can be accomplished using, for example, the Diffie-Hellman key exchange technique.

Figure 16:
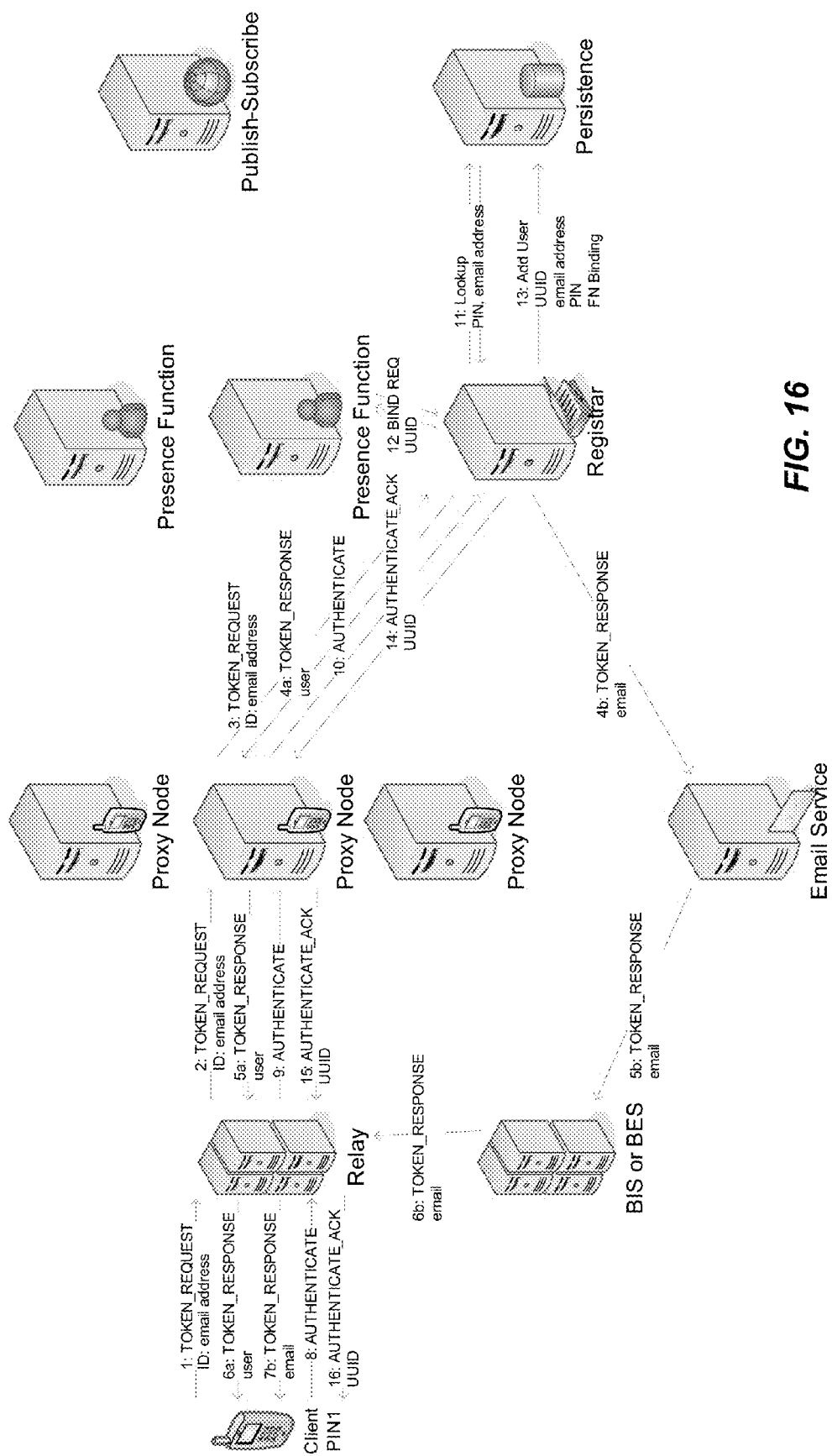
FIG. 16 schematically depicts how a user identifier is selected and authenticated as a second phase of the presence registration procedure.

FIG. 16 schematically depicts how a user identifier is selected and authenticated as a second phase of the presence registration procedure. This figure illustrates, by way of example, the selection and authentication of the user identifier as the second phase of the presence registration procedure.

The procedure is initiated when the user's device sends, e.g., the [1:TOKEN_REQUEST]) message to the Presence Registrar. This message contains an identifier, typically an e-mail address, selected by the user. To verify that the user actually owns the identifier, the presence registrar sends, e.g., [4a:TOKEN_RESPONSE] to the presence client using the presence protocol and also sends, e.g., [4b:TOKEN_RESPONSE] to the presence client via e-mail. These TOKEN_RESPONSE messages each contain unique security material which the presence client combines and sends back to the presence registrar in, e.g., the [8:AUTHENTICATE] message to prove ownership of the e-mail identifier. Other authentication techniques may be used in lieu of, or in addition to, the procedure described above.

Upon successful authentication of the user's identifier the presence registrar performs a lookup, e.g., [11:Lookup] to determine if the user is a new registrant or if they have previously registered with the presence service. In this scenario the user is a new registrant so the presence registrar generates a new Universally Unique Identifier (UUID) for the user, establishes a binding for the user with a function node using a binding request message, e.g., [12:BIND_REQ] and adds the user's profile in the persistent data store using an add message, e.g., [13:Add User].

The final step of the presence registration procedure is to send an authentication acknowledgement, e.g., [14:AUTHENTICATE_ACK] back to the presence client to acknowledge successful registration. The acknowledgement message contains the user's newly generated UUID.

Figure 17:
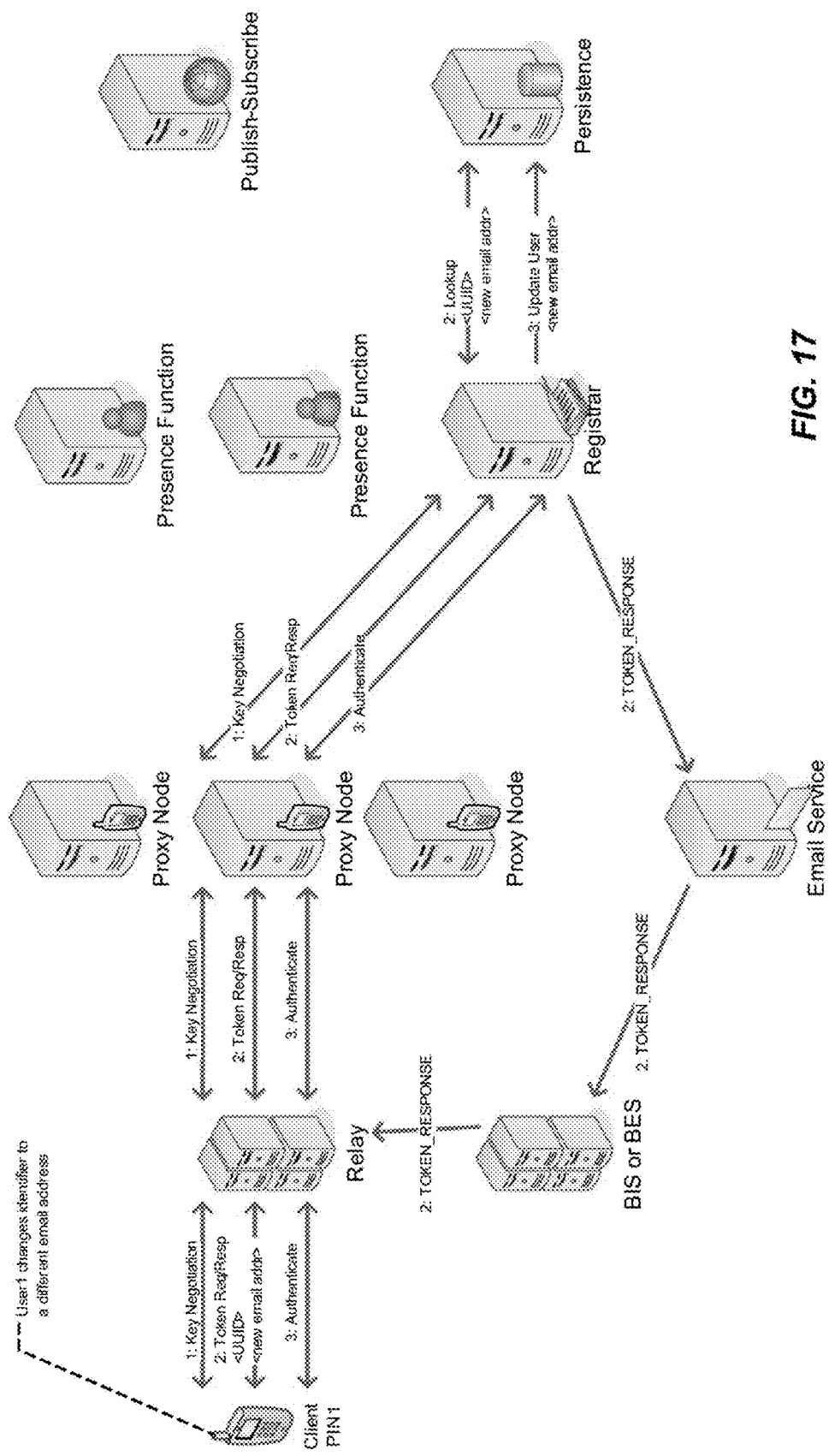
FIG. 17 schematically depicts how a user identifier can be changed.

Upon completion of this phase the user is registered with the presence service. The following has thus been accomplished:
  UUID generated/assigned to the user
  Association of e-mail address and mobile device identifier with UUID
  Binding with function node established
  User profile created in persistent data store FIG. 17 schematically depicts how a user identifier can be changed. This scenario illustrates the procedure that is run when a user decides to change their user identifier to a different e-mail address. The procedure is similar to the presence registration procedure described above but differs slightly in that the presence client is already known to the presence service. Accordingly, the user's UUID is included in the token request message, e.g. [TOKEN_REQUEST]. The user profile is then updated in the persistent data store. It is to be noted that the binding with the function node is already in place from the initial registration.

Sharing and Updating a Virtual Business Card

In addition to collecting, managing and disseminating presence information, the presence system disclosed herein may also be used to share and update virtual business cards. A virtual business card, such as, for example a vCard, is a data file that stores a contact's name, company name, work address, telephone and fax numbers, e-mail address, etc.

Figure 18:
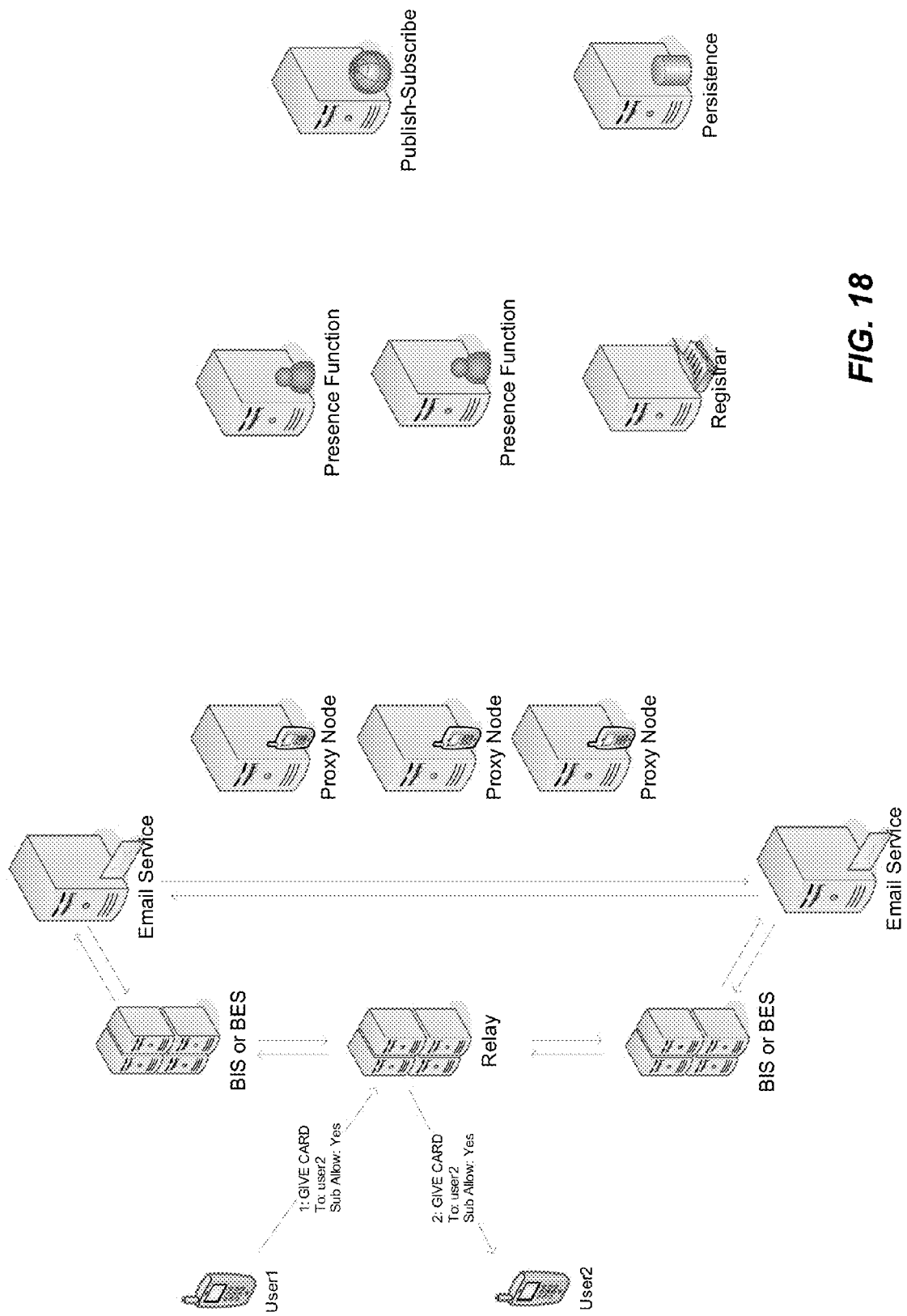
FIG. 18 schematically depicts how an electronic (virtual) business card can be shared, for example, as a vCard e-mail attachment.

FIG. 18 schematically depicts how an electronic (virtual) business card can be shared, for example, as a vCard e-mail attachment. This figure illustrates, by way of example, one particular way in which a user could give their electronic or virtual business card to another user as a vCard e-mail attachment. It is appreciated that vCard is used solely by way of example, and that a business card of another format or type could also be exchanged or shared in the same manner.

It is possible to allow users to exchange business cards using other methods such as via an Instant Messaging session or through other means.

Figure 19:
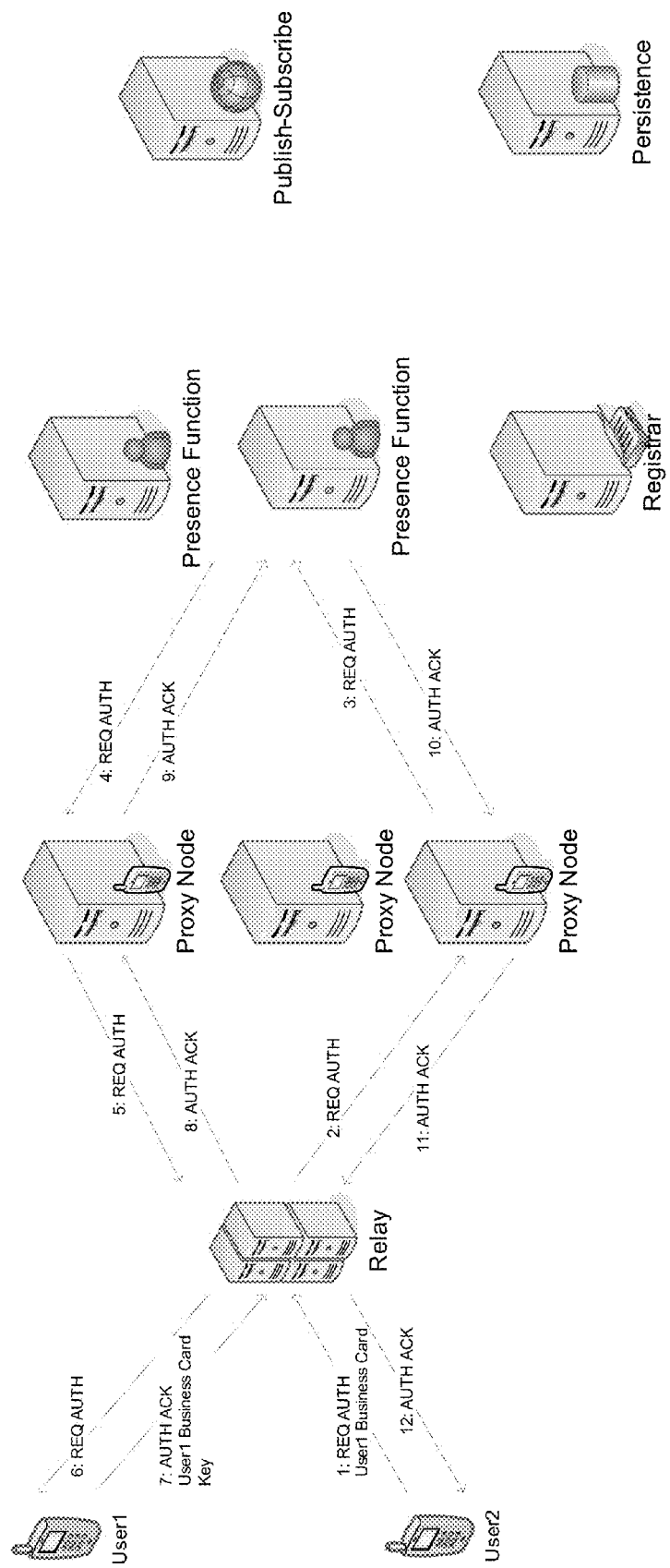
FIG. 19 schematically depicts how a user can receive an electronic business card and request authorization to subscribe to the electronic business card so as to automatically receive subsequent changes to the electronic business card.

FIG. 19 schematically depicts how a user can receive an electronic business card and request authorization to subscribe to the business card so as to automatically receive subsequent changes to the business card. When a user receives a business card from another user, the recipient user may be offered the choice to subscribe to changes to the business card information. If the recipient user accepts the offer to subscribe, an authorization procedure is initiated. In this figure, User2 requests authorization to subscribe to changes in User1's business card. The messages involved in this procedure are exchanged as peer-to-peer (p2p) messages in the presence protocol. As part of the authorization procedure, User1 shares an encryption key with User2 to enable decryption of the business card information.

Figure 20:
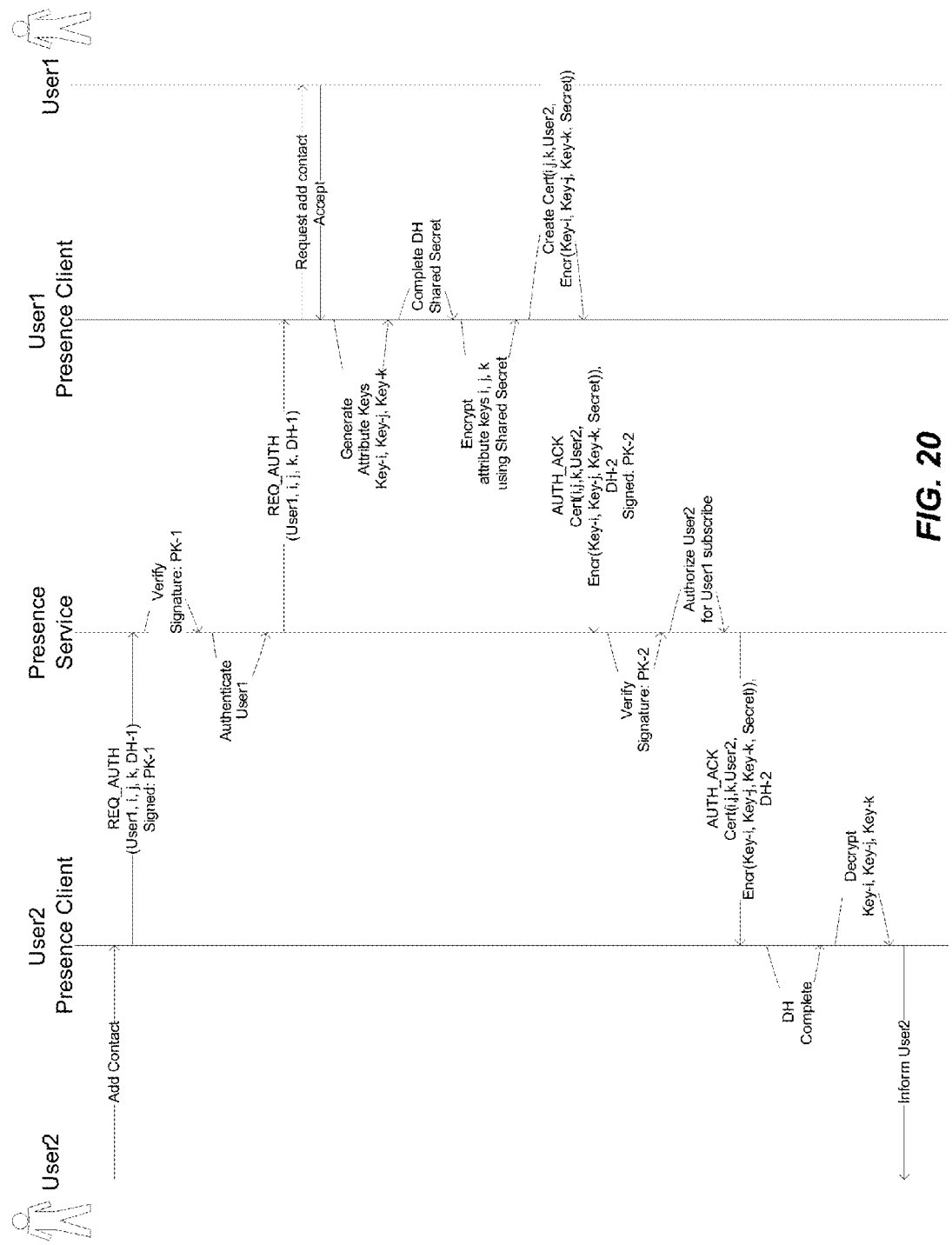
FIG. 20 presents a message sequence for the authorization procedure of FIG. 19.

FIG. 20 presents a detailed message sequence for the authorization procedure of FIG. 19. When the authorization procedure is completed, User2 may proceed to create a subscription.

Figure 21:
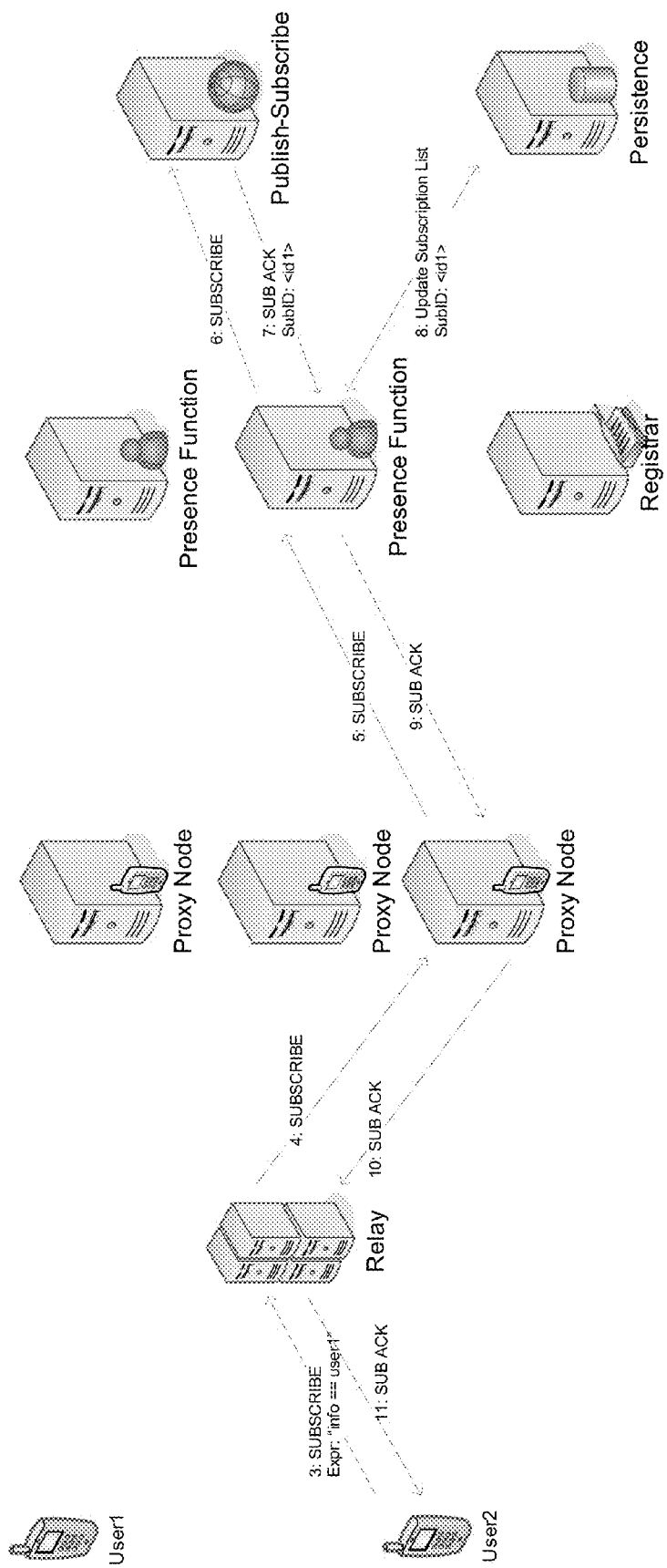
FIG. 21 schematically depicts a subscription message flow for subscribing to an electronic business card whereby, upon completion of this procedure, a subscription will have been created in a publish-subscribe subsystem and a record of the subscription will be saved in a persistent data store.

FIG. 21 schematically depicts a subscription message flow for subscribing to a business card whereby, upon completion of this procedure, a subscription will have been created in a publish-subscribe subsystem (i.e. in the Pub-Sub Core) and a record of the subscription will be saved in a persistent data store.

Figure 22:
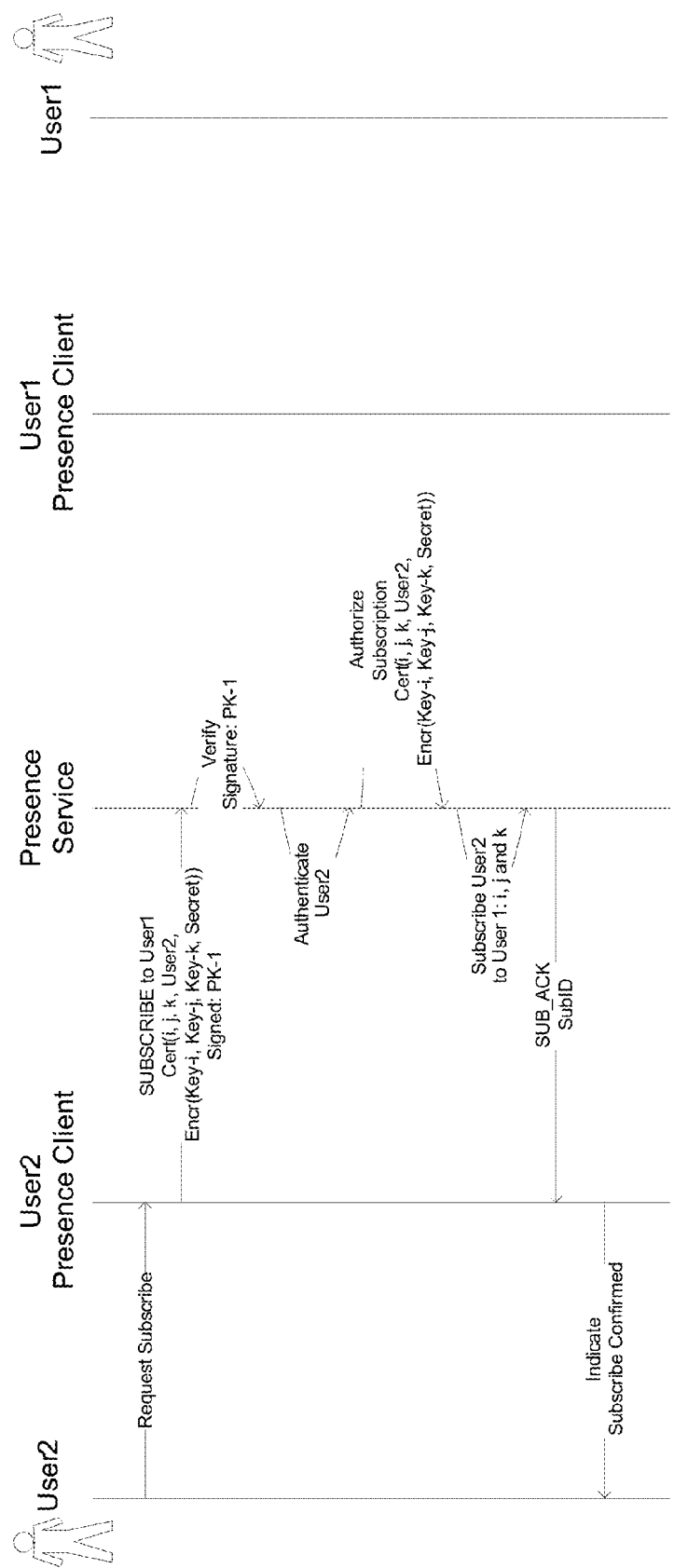
FIG. 22 presents a message sequence for the subscription procedure of FIG. 21.

FIG. 22 presents a complementary message sequence for the subscription procedure of FIG. 21. As depicted in this figure, when User2 requests a subscription, a SUBSCRIBE message is sent from User2's presence client to the presence service which verifies the signature, authenticates User2, authorizes the subscription, subscribes User2 to User1, and then sends a subscription acknowledgement (SUB-ACK) with a subscription ID (SubID) back to User2's presence client, which indicates to User2 that the subscription process has been completed. An authorized subscription relationship is thus established between User1 and User2.

Figure 23:
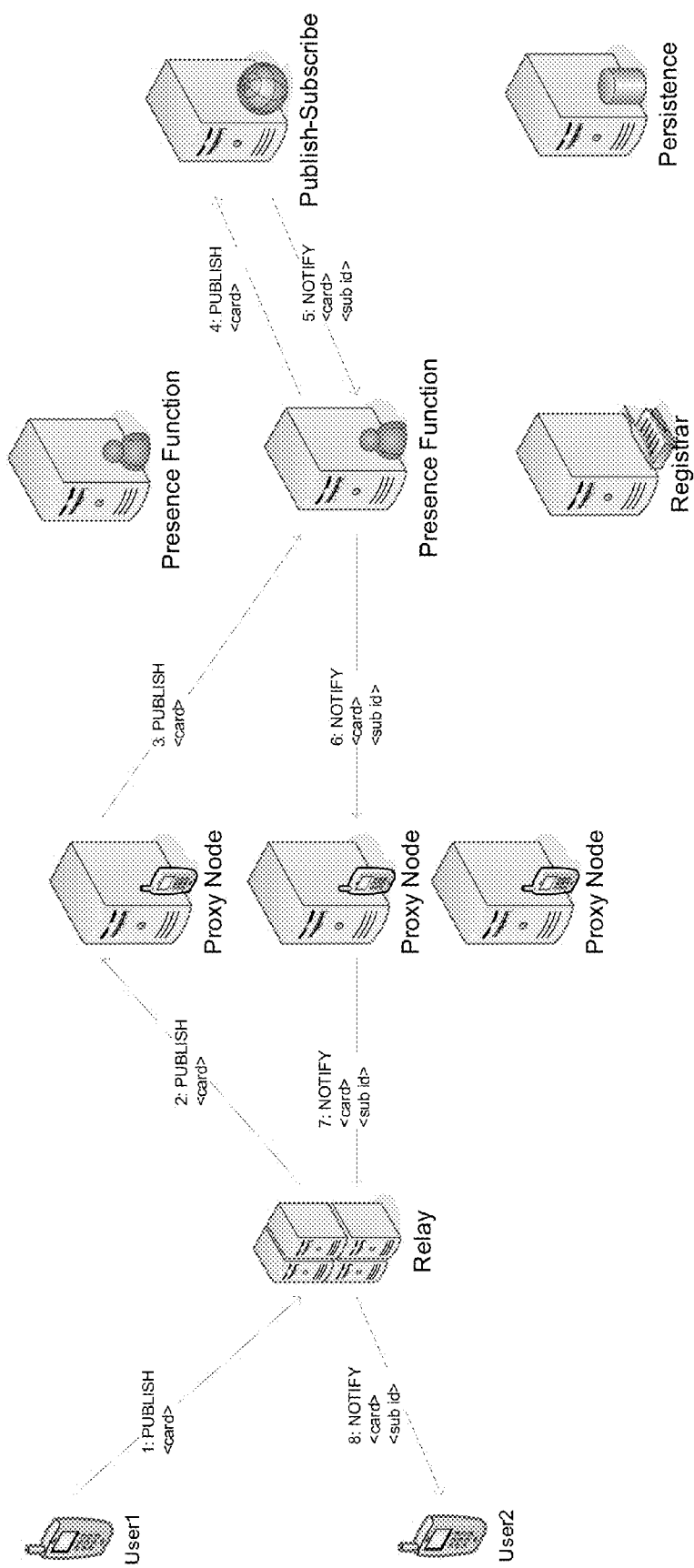
FIG. 23 schematically depicts a message flow for updating/publishing changes made to an electronic business card.

FIG. 23 schematically depicts a message flow for updating/publishing changes made to an electronic or virtual business card. As depicted in FIG. 23, the process of updating a business card is initiated when User1 publishes a change to the card (1: PUBLISH <card>) from, for example, a mobile device to a relay. The relay passes along the update message (2: PUBLISH <card>) to a proxy node which forwards the update message (3: PUBLISH <card>) to a presence function server which, in turn, forwards the message (4: PUBLISH <card>) to a Publish-Subscribe server (part of the Pub-Sub Core). The Publish-Subscribe server replies with notify message (5: NOTIFY <card>, <sub id>) to the presence function node which forwards the message (6: NOTIFY <card>, <sub id>) to a different proxy node which, in turn, sends the notification message (7: NOTIFY <card>, <sub id>) to the relay. The relay then communicates the notification message (8: NOTIFY <card>, <sub id>) to User2's device.

Publication, Notification and Subscription Management

Figure 24:
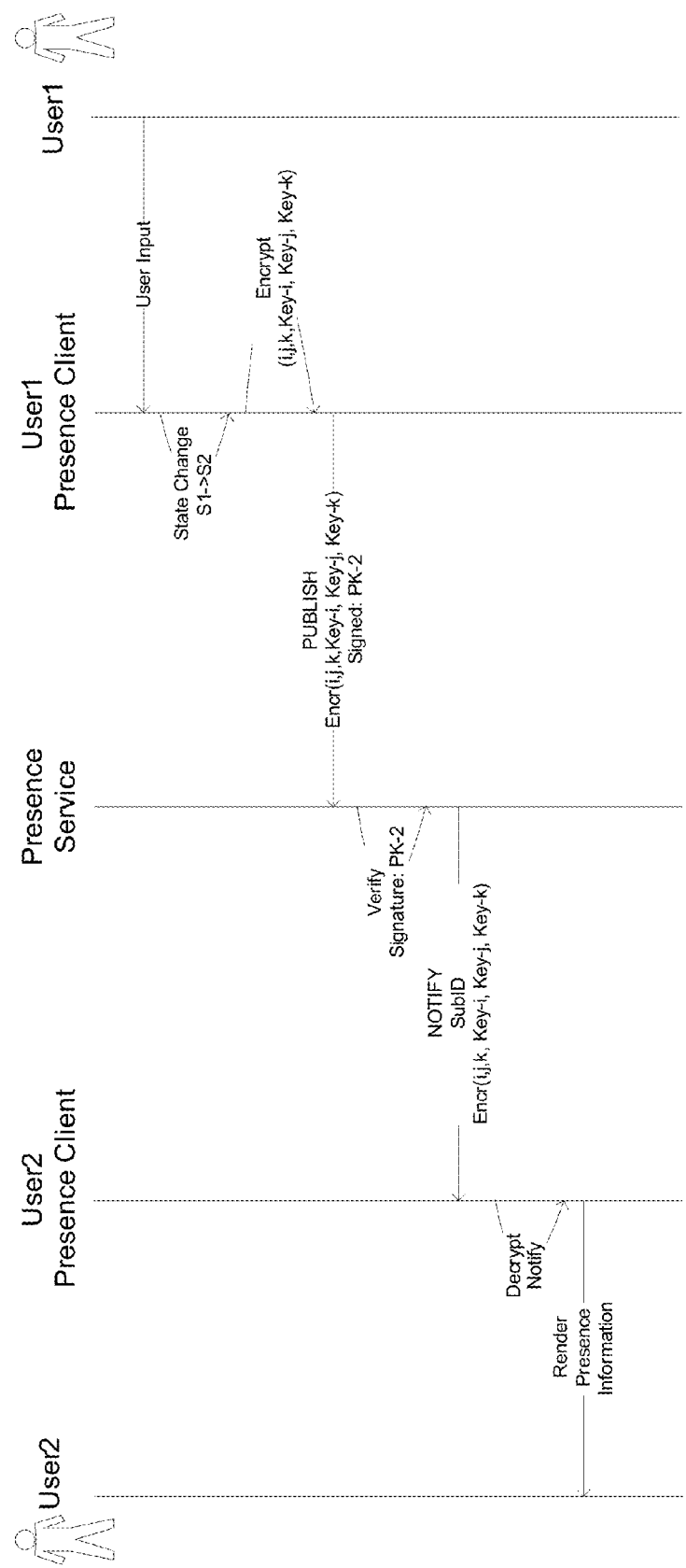
FIG. 24 presents a message sequence for the publish-notify procedure of FIG. 23.

FIG. 24 presents a message sequence for the publish-notify procedure of FIG. 23 or for any other situation when a first user (User1) publishes new presence information or a status change in existing presence information for which a second user (User2) has a subscription. As shown in FIG. 24, user input from User1's causes a state change at the User1 presence client. User1's presence client encrypts the state change and publishes this to the presence service which verifies the signature and, assuming the signature is valid, notifies the User2 presence client by sending the subscription ID and the encrypted state change which the User2 presence client can decrypt. The presence information (state change) can then be made available to User2.

Figure 25:
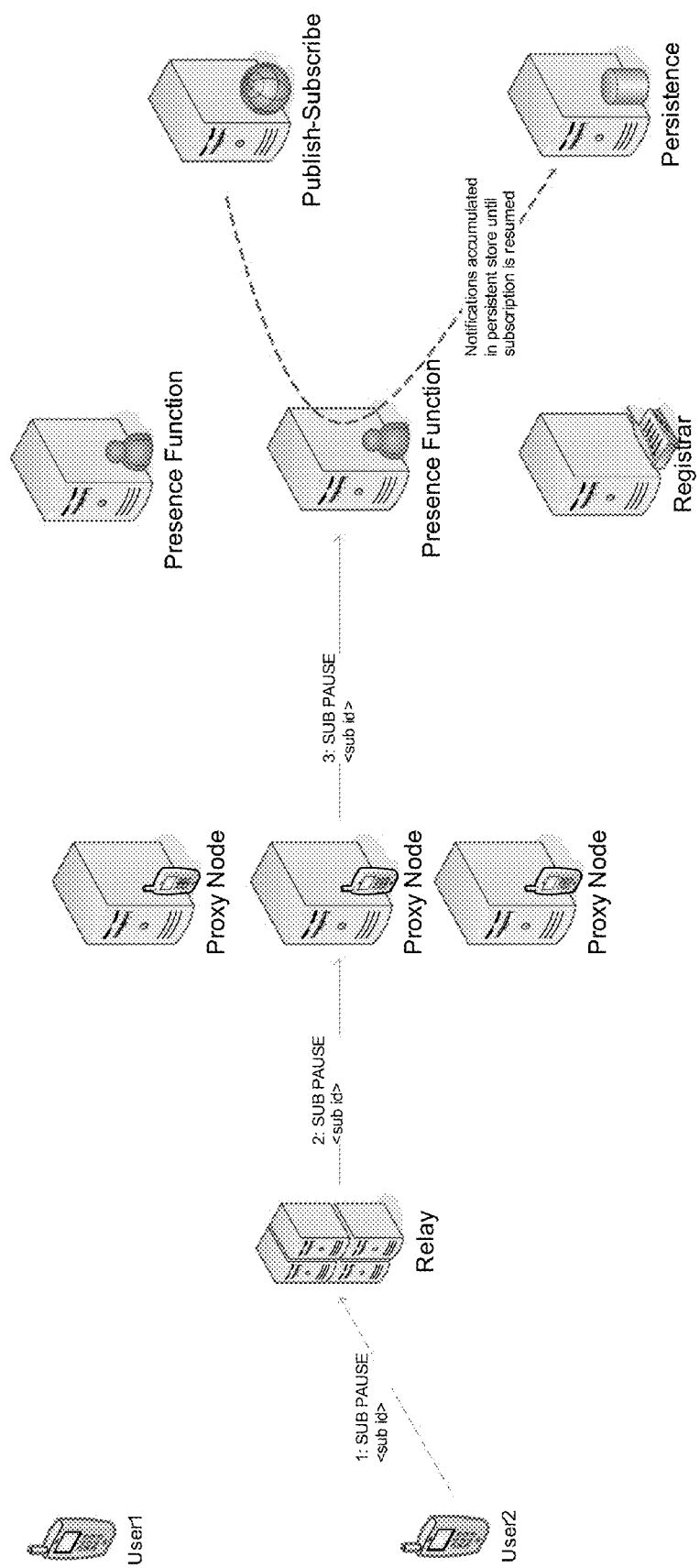
FIG. 25 schematically depicts a message flow for pausing an electronic business card subscription.

FIG. 25 schematically depicts a message flow for pausing a subscription, e.g. a subscription for presence information or, alternatively, a subscription to another person's business card, as the case may be. This figure shows an example in which User2 communicates a pause subscription message (SUB PAUSE <sub id>) to the relay which, in turn, sends a pause subscription message containing the subscription ID to a proxy node. The proxy node sends a pause subscription message (also with the subscription ID) to a function server in the function tier. Thereafter, notifications are merely accumulated in the persistent data store until the subscription is resumed.

Figure 26:
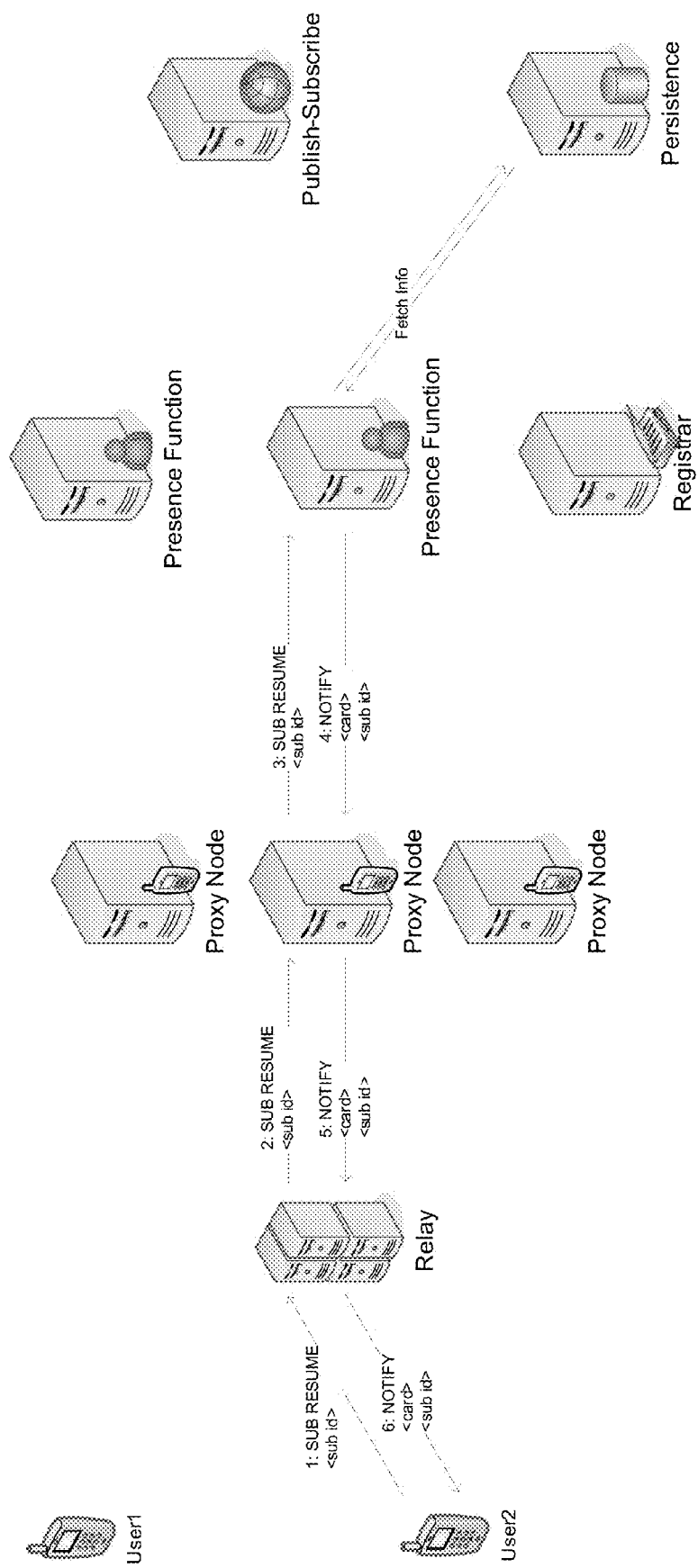
FIG. 26 schematically depicts a message flow for resuming an electronic business card subscription.

FIG. 26 schematically depicts a message flow for resuming a subscription. As depicted in this further example, the subscription can be resumed when User2 communicates a subscription resume message (SUB RESUME <sub id>) containing an identification of the particular subscription that is to be resumed to the relay which communicates a subscription resume message to a proxy node. When the proxy node communicates a subscription resume message to the function server in the function tier, the function server fetches the information from the persistent data store and notifies the proxy node with a notification message (NOTIFY <card>, <sub id>). The proxy node communicates the notification message to the relay which, in turn, sends the notification message to the User2 device.

Switching Devices

Occasionally, a user will switch devices (e.g. upgrade his or her mobile device to a newer model). There are two key scenarios relating to the switching of devices.

Figure 27:
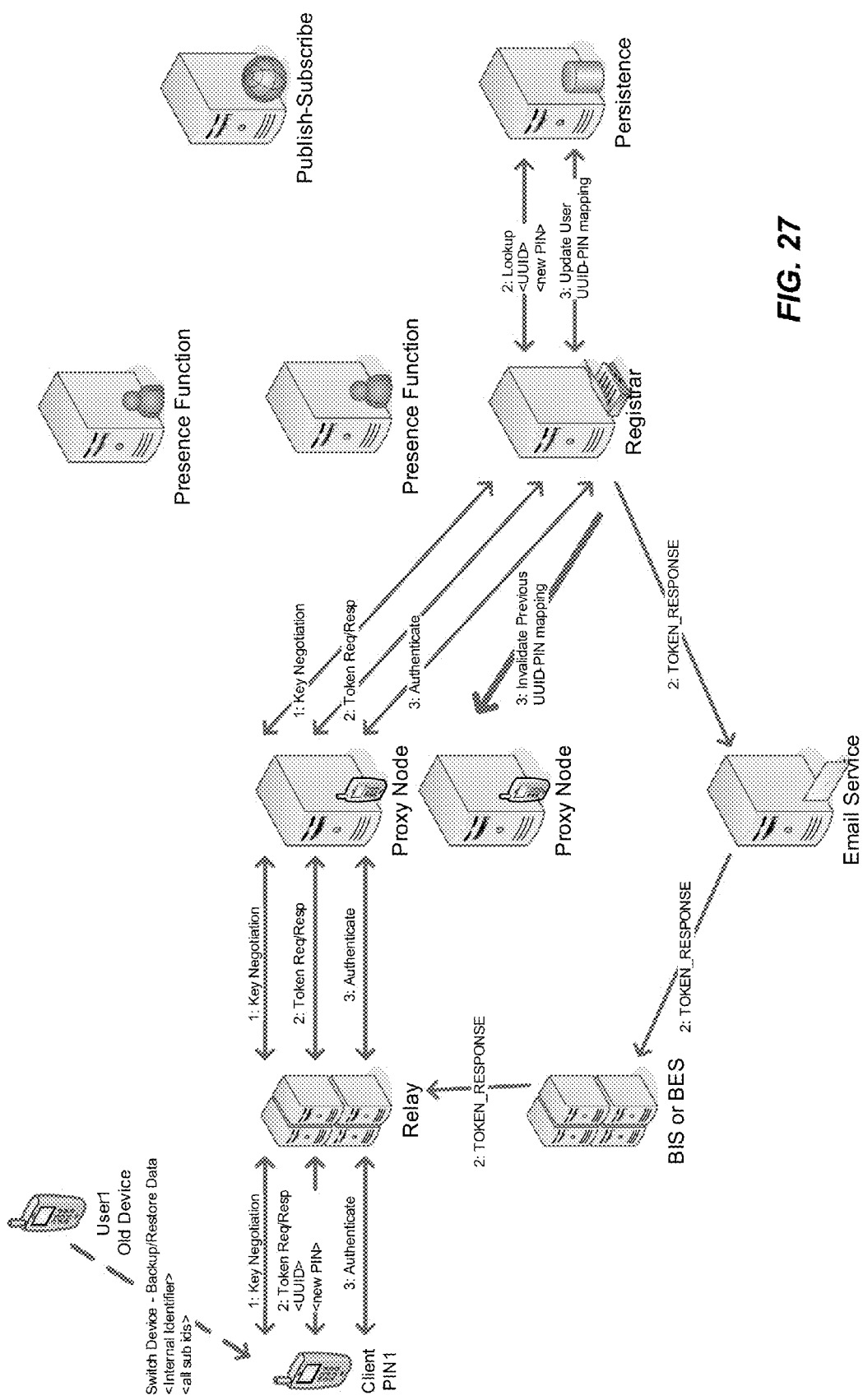
FIG. 27 schematically depicts a message flow for a backup/restore procedure when a user switches devices.

In the first scenario, an up-to-date (fresh) copy of the old device's data is copied to the new device via a backup/restore procedure. FIG. 27 schematically depicts a message flow for a backup/restore procedure when a user switches from an old device to a new device. Following the backup/restore procedure, the new device possesses all of the necessary data to resume normal operation with the presence service. User1 may then re-run the presence registration procedure to update the UUID-mobile device identifier mapping in persistent data store as shown in FIG. 27. The procedure is similar to the new registration scenario except that in this case the new device includes the user's UUID in the token request/response procedure to inform the presence service that the user is already a registered user.

Figure 28:
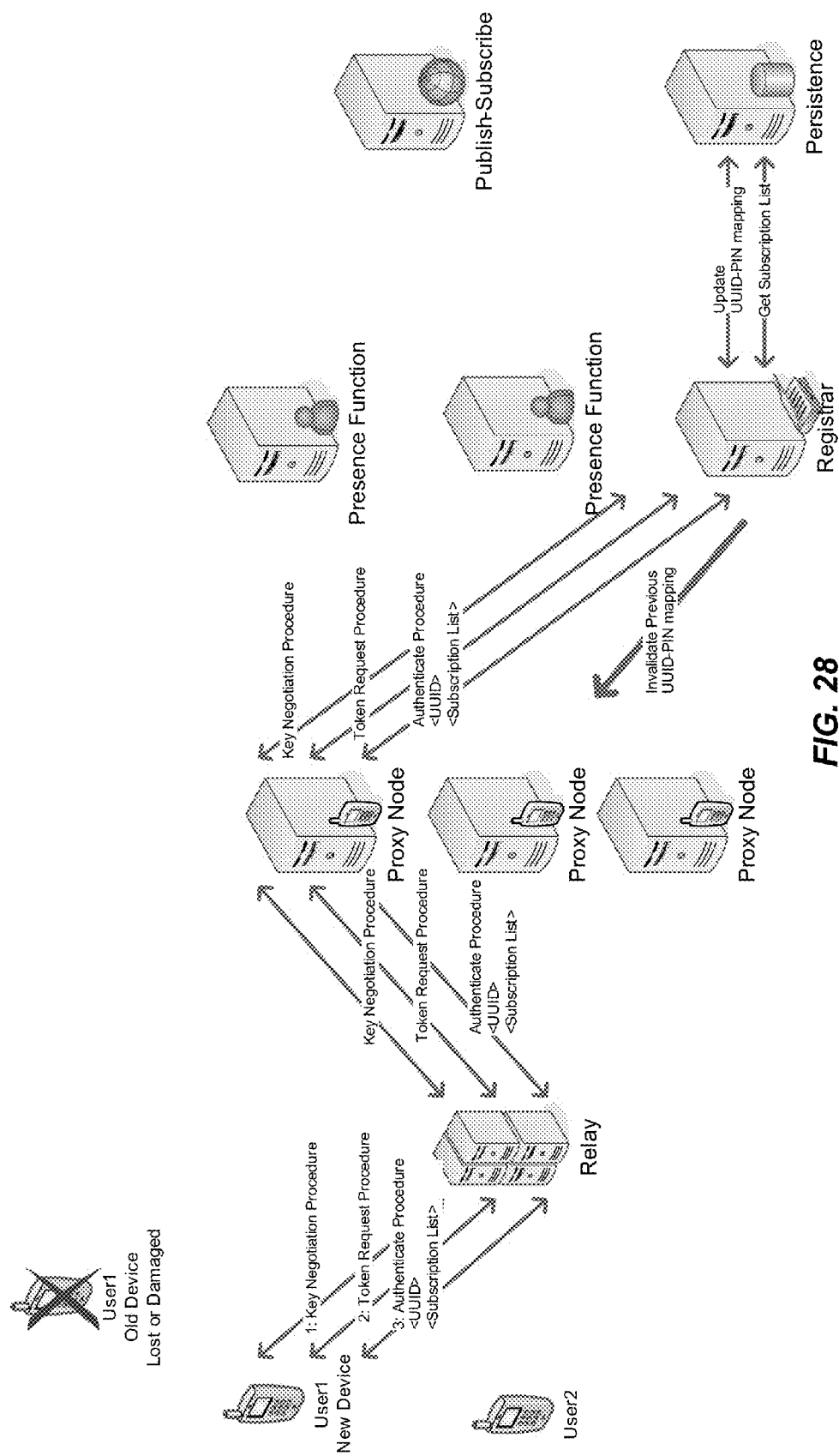
FIG. 28 schematically depicts a message flow for a re-registration process when a user switches devices but a current backup of the data from the old device is unavailable.

In the second scenario, a current backup of the data from the old device is unavailable. This might happen, for example, if the old device was lost or damaged. FIG. 28 schematically depicts a message flow for a re-registration procedure when a user switches devices but a current backup of the data from the old device is unavailable. This figure illustrates a scenario in which User1 switches to a new device but a current backup of the data from the old device is not available. To become operational with the presence service again the user has the e-mail address previously selected as the user identifier directed to the new device and executes the presence registration procedure using the same e-mail address previously selected as the user identifier. The presence registrar recognizes the user as having been previously registered (by identifying the user by his previous e-mail address) and delivers the user's UUID and subscription list the new device.

Figure 29:
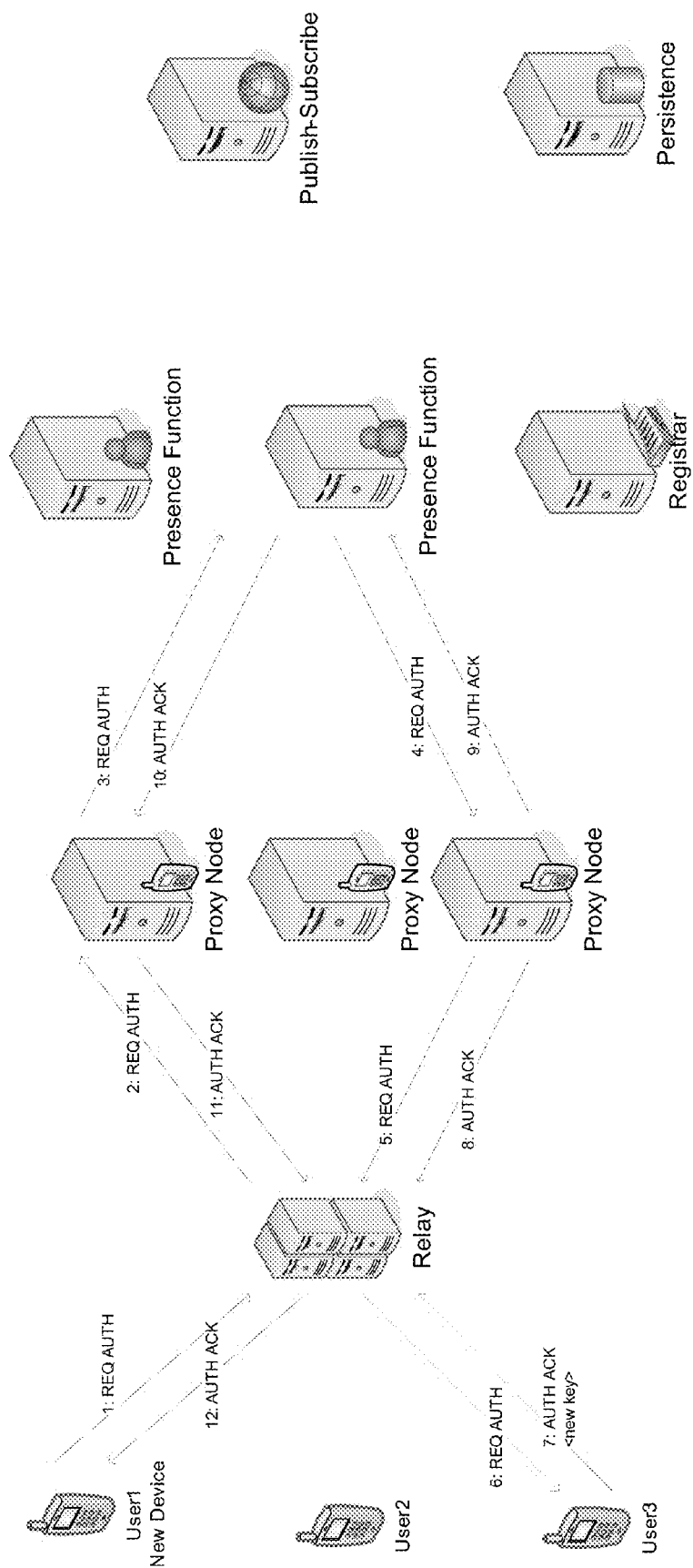
FIG. 29 schematically depicts a message flow when a user, upon switching devices and re-registering, requests re-authorization and new keys from each contact.

FIG. 29 schematically depicts a message flow when a user, upon switching devices and re-registering, requests re-authorization and new keys from each contact.

Figure 30:
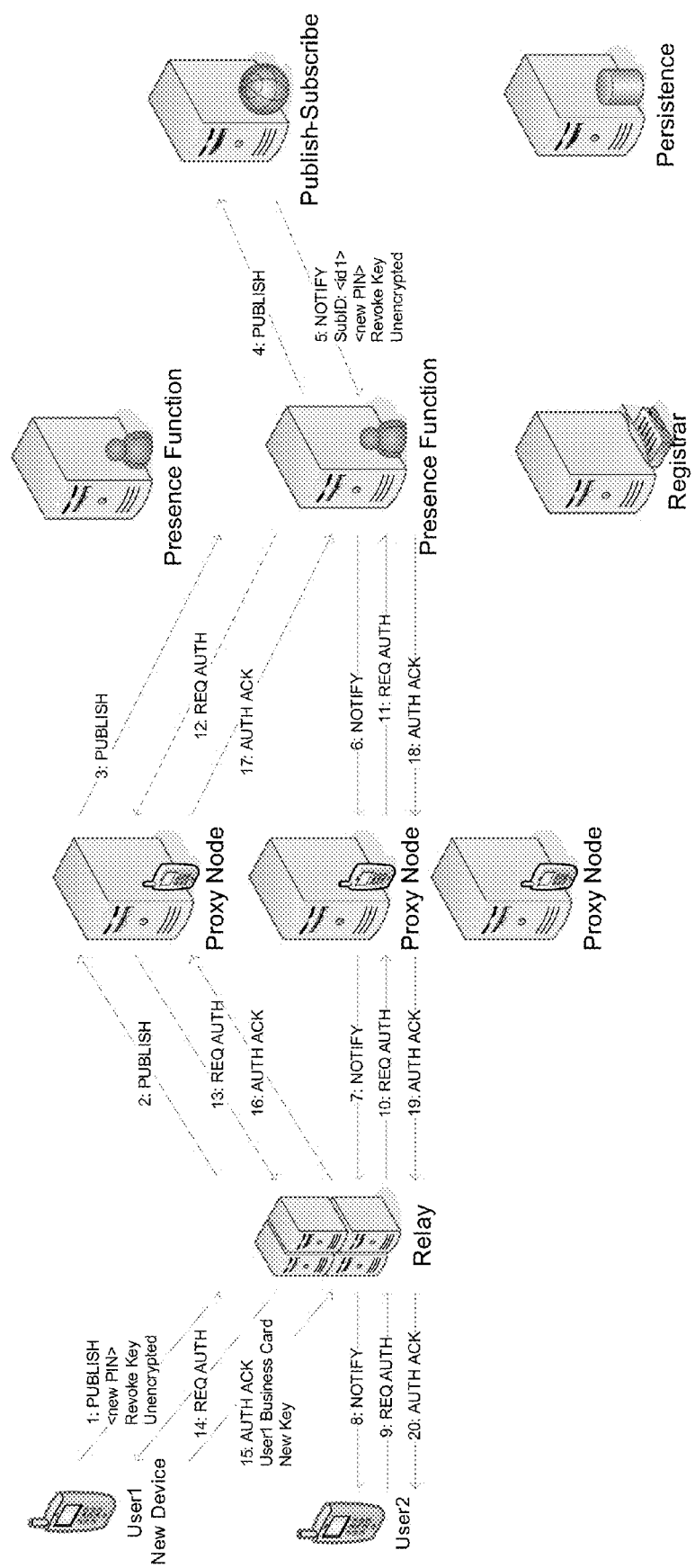
FIG. 30 schematically depicts a message flow when a user, upon switching devices, revokes and re-issues keys to all watchers.

Using the subscription list obtained from the re-registration procedure the user may request re-authorization and new keys from each contact. Existing subscriptions are in place and active so there is no need to create new subscriptions or to modify existing subscriptions. If authorization is not granted then subscriptions should be removed to avoid receiving unwanted notifications. The next step is thus to revoke authorization and encryption keys that have been given to other contacts. This will trigger those contacts to request re-authorization and obtain new keys as shown in FIG. 30. In other words, the authorized subscription relationship is temporarily severed and then re-established.

FIG. 30 schematically depicts how keys can be revoked and reissued to various watchers when a user switches devices. A message that is specifically formatted to match the subscription criteria of subscribed contacts is published. Since User1's device no longer knows the keys that were previously shared with the subscribed contacts the message can not be encrypted. The message contains User1's user identifier (i.e., email address), the mobile device identifier of User1's new device and an indication that previously shared keys are revoked.

All subscribed contacts will receive notifications containing the message from User1. If the subscribed contact so wishes, these contacts may request re-authorization and new keys from User1.

The presence system described above can be used with any networked computing device or communications device, including, personal computers, laptops, tablets, wireless communications devices (including PDAs, smart phones, cell phones, or any other type of mobile phone). Although the presence technology can be used with a static computing device, it is particularly useful when utilized in conjunction with mobile devices that are equipped with location-determining subsystems such as, for example, Global Positioning System (GPS) receivers as this provides location-based presence information.

Figure 31:
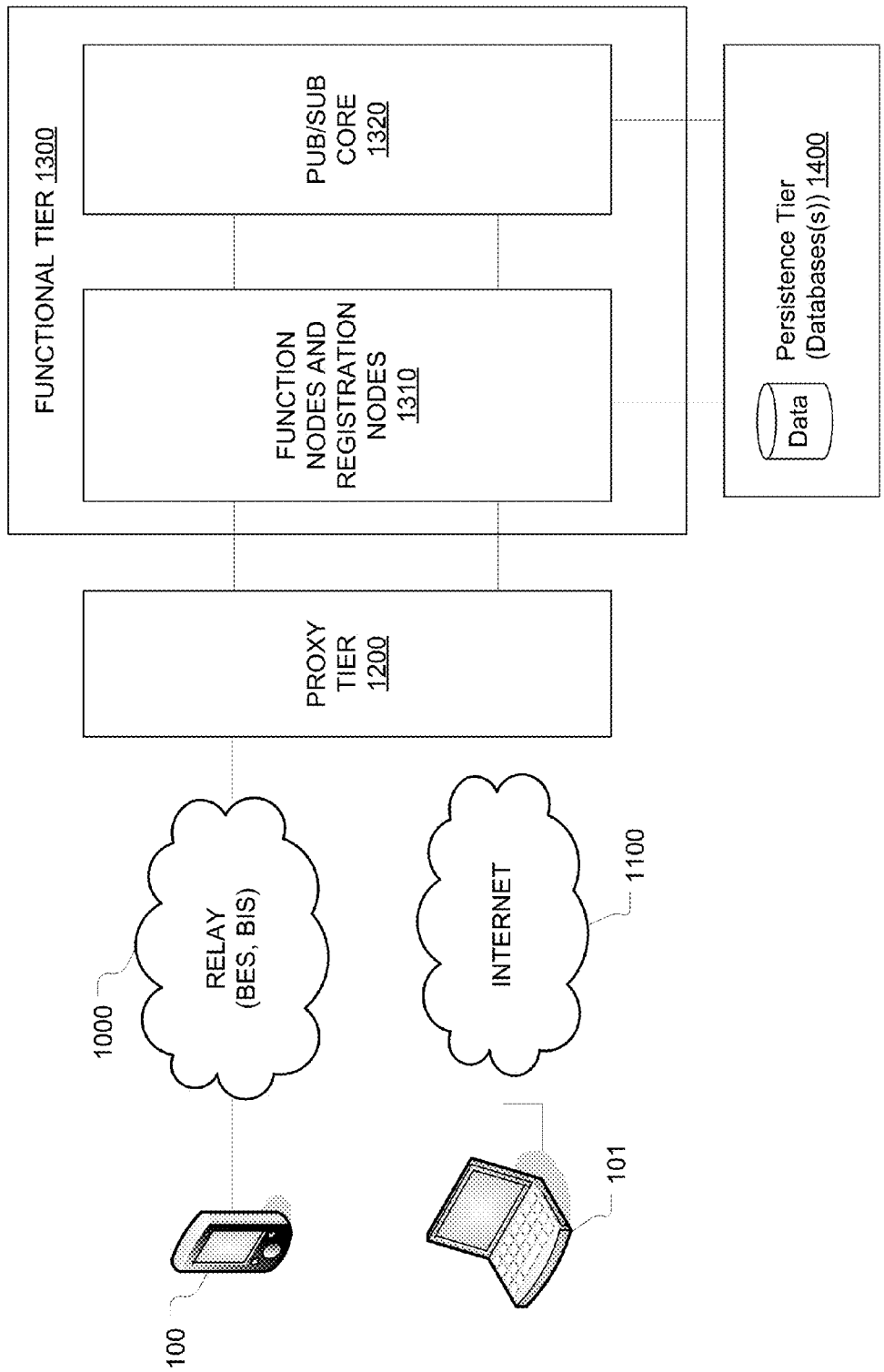
FIG. 31 schematically depicts how the presence system can interact with both a wireless client via a mobile network infrastructure and a wired client via a standard internet connection.

FIG. 31 schematically depicts how the presence system can interact with both a wireless client 100 via a mobile network infrastructure 1000 and a wired client 101 via a standard internet connection 1100. The mobile network infrastructure 1000 and the internet connection 1100 are linked to one of a plurality of proxy nodes of the proxy tier 1200 depending on the location of the clients 100, 101. The proxy nodes act as routers to route messages from the clients 100, 101 to a predetermined (pre-assigned) function node of the functional tier 1300. The functional tier 1300 includes function nodes 1310 (and may also include one or more registration nodes). The functional tier 1300 also includes a publish-subscribe subsystem (Pub-Sub Core 1330). The system also includes a persistent data store 1400 for storing generally invariable user identification data and for storing a mapping that links each user (via, e.g. a universally unique ID) to each device (via, e.g. a mobile device identifier number associated with the device such as, for example, an International Mobile Equipment Identity (IMEI) number which uniquely identifies a GSM, UMTS, LTE or iDEN mobile device or a Mobile Equipment Identifier (MEID) which uniquely identifies a CDMA mobile device).

Referring to the presence system depicted in FIG. 31, the system enables a first presence client (e.g. wireless client 100) associated with the first user to share presence information with a second presence client (e.g. wired client 101) associated with the second user. The persistent data store 1400 stores information about the first user and the second user. A proxy node of the proxy tier 1200 routes a message relating to presence information from the first presence client to a predetermined function node (of the functional tier 1300) to which the first presence client has already been bound. The function node within the functional tier 1300 processes the message from the first presence client to determine whether the message pertains to registration, publication or subscription. A publish-subscribe subsystem (Pub-Sub Core 1330) connected to the function node stores published data content and compares the published data content with subscription expressions received from the second presence client. The publish-subscribe subsystem (Pub-Sub Core 1330) communicates presence information about the first user to the second user when content defined by subscription expressions provided by the second user matches published data content provided by the first user. While it is advantageous to implement the presence system in the manner illustrated in this figure, i.e. with proxy nodes decoupled from function nodes and with function nodes decoupled from the pub-sub core, it is also possible to combine one or more of the nodes depicted in this figure into one or more multi-functional nodes. It should also be appreciated that the additional (backup) nodes may be inserted to provide network redundancy and resiliency.

In one implementation of this exemplary system, the proxy node is configured to route the message relating to presence information based on an identity of the presence client (i.e. which user it is) and a specific application identified in the message.

In one implementation of this exemplary system, the publish-subscribe subsystem (Pub-Sub Core 1330) employs independently operable publication and subscription servers, i.e. the publication server(s) and the subscription server(s) function independently of each other. Accordingly, data content can be published even if no matching subscription exists. Likewise, a subscription can be created even if no matching data content has yet been published. For example, a user can publish presence information about himself using any arbitrary descriptors (which need not be pre-defined). Likewise, a watcher can define a subscription expression using any arbitrary language even if there is no published data content relevant to the subscription expression.

The novel presence system disclosed herein is predicated upon a content-based model in which subscribers express their interest by specifying conditions over the content of events they want to receive. A subscription is a query formed by a set of constraints usually in the form of name-value pairs of properties and basic comparison operators (=, <<=, >, >=) which identify valid events. A constraint may also be of the form of a regular expression.

In content-based publish-subscribe systems, events are not classified according to pre-defined criteria, but rather according to properties of the events themselves. Hence the correspondence between publishers and subscribers is on a per-event basis. The higher expressive power of a content-based system comes at the price of higher consumption of resources needed to calculate the set of interested subscribers for the each event.

Because a content-based publish-subscribe system inspects the content of each event in order to match with subscriptions, it is not possible to support full end-to-end encryption of the content of events. The content is temporarily decrypted while matching is performed. In a variant, however, it is possible to assign labels or descriptors to encrypted content to enable the system to identify the encrypted content by its label and to communicate the encrypted content without decrypting it until it reaches the watcher (who has been previously given the specific key to decrypt the encrypted content).

In one implementation, the system includes a registration node for managing registration and re-registration functions (as already described above).

Figure 32:
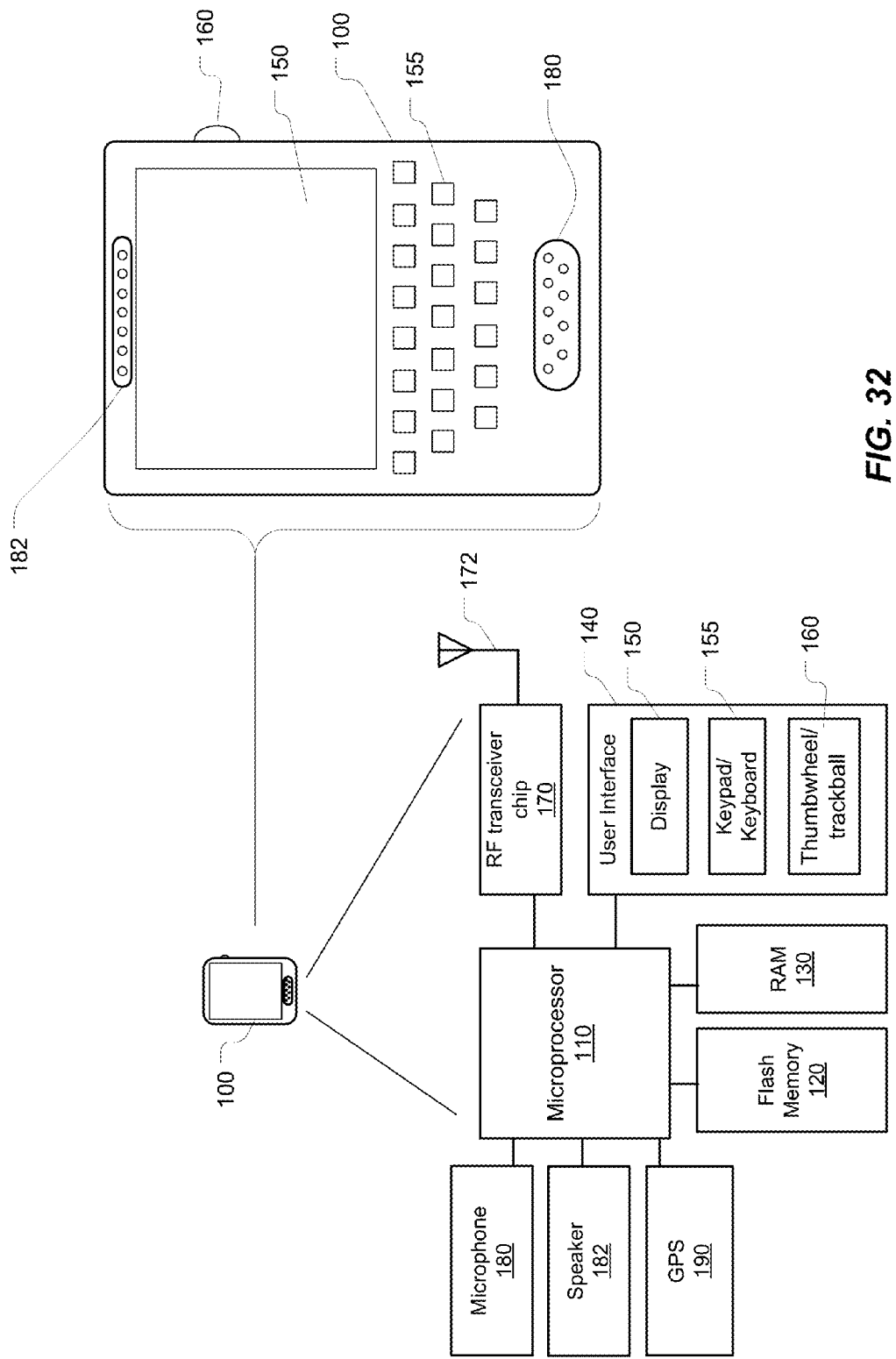
FIG. 32 is a schematic depiction of a wireless communications device that can be used to interact with the presence system.

FIG. 32 depicts schematically a wireless communications device 100 on which the present technology can be implemented. For the purposes of this specification, the expression "wireless communications device" is meant to encompass a broad range of electronic communication devices that have processors and memory and which are capable of wireless ("over-the-air") communication. Accordingly, "wireless communications device" is meant to encompass wireless-enabled laptops, tablet PCs, portable, handheld or mobile electronic devices such as smart phones, cell phones, satellite phones, and wireless-enabled PDA's, etc., or any hybrid or multifunction device that has a radio-frequency (RF) transceiver.

Referring to FIG. 32, each wireless communications device 100 includes a microprocessor 110 or central processing unit (or simply a "processor") and a memory for storing data. The memory may include both a Flash memory 120 and a random access memory (RAM) 130. Each wireless communications device 100 also has a user interface 140 that includes a display (graphical user interface—GUI) 150, e.g. an LCD screen, a keyboard/keypad 155 and an optional thumbwheel/trackball 160. Each wireless communications device 100 includes an RF transceiver chip 170 for wireless communications, i.e. receiving and transmitting both voice and data over separate channels. For voice communications, the wireless communications device 100 has a microphone 180 and a speaker 182.

In addition, as shown schematically in FIG. 32, the wireless communications device 100 may include a Global Positioning System (GPS) chipset for obtaining position fixes from orbiting GPS satellites. References to GPS are meant to also include Assisted GPS or Aided GPS.

Although the present disclosure refers expressly to the "Global Positioning System" or "GPS", it should be understood that the term "GPS" is being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system. In lieu of, or in addition to, GPS, the wireless communications device may use another type of location-determining subsystem. Although GPS is the best way presently known for obtaining a current position fix, a different type of positioning subsystem or location-determining subsystem can be used, e.g. a radiolocation subsystem that determines its current location using radiolocation techniques, as will be elaborated below. In the main implementation, though, the GPS chipset 190 receives and processes signals from GPS satellites to generate latitude and longitude coordinates, thus making the device "location aware".

In lieu of, or in addition to, GPS coordinates, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Other location-determining techniques (of varying granularity) can also be employed for the purposes of providing location-related presence data, such as, using the identity of the nearest base station, accessing data stored in a Home Location Register/Visitor Location Register (HLR/VLR), etc.

Figure 33:
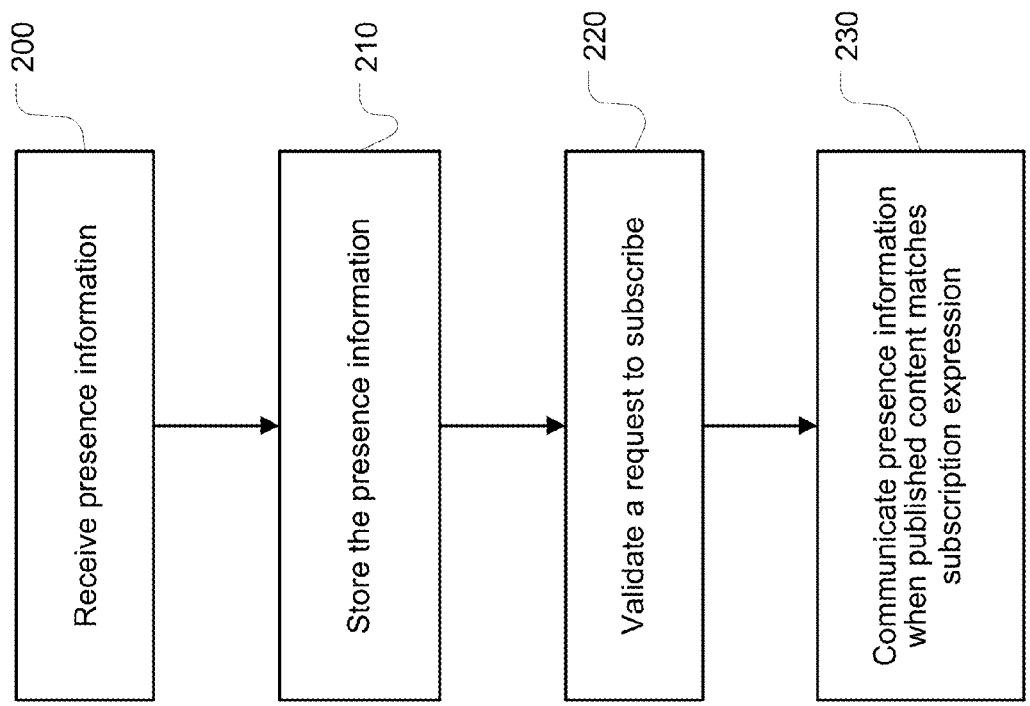
FIG. 33 is a flowchart depicting some of the main steps of a method of disseminating presence information.

FIG. 33 is a flowchart outlining some of the main steps of an exemplary method of providing presence information about a first user to a second user, the method comprising a step 200 of receiving presence information published from a presence client associated with the first user, a step 210 of storing the presence information in any arbitrary data format, a step 220 of validating a request to subscribe to the presence information associated with the first user by determining if the second user has been authorized by the first user to subscribe to the presence information, and a step 230 of communicating the one or more elements of the presence information to a presence client associated with the second user when content requested by the second user matches content published by the first user.

In one implementation of this method, the act of validating the request to subscribe entails an act of determining which one or more of a plurality of elements of presence information the first user has authorized the second user to receive. In other words, the first user (the one who publishes his presence information) may authorize the second user to obtain all the presence information that he publishes or merely a subset of this information. In one implementation, the first user may authorize the second user to receive (watch) only certain attributes (elements) of the presence information while restricting access to other attributes. For example, the first user may allow the second user to be notified of the first user's mood and availability but not his location.

In a variant of this implementation, the user may define a set of conditions (e.g. time of day, location, mood, availability) that determine how much access the second user (watcher) may be granted. For example, the first user may specify that the second user may receive presence information pertaining to his mood and availability provided that the time of day is outside of normal working hours and that the location of the second user is within a certain radius of the first user.

In this manner, the first user may set up a highly nuanced set of conditions (in, for example, a watcher profile for the second user) that modulates the access to the presence information. The watcher profile may be statically defined (a set of specified conditions that the first user affirmatively stipulates) or dynamically defined (the conditions may change based on the first user's own presence information, e.g. location, mood, activity, etc., or based on the second user's presence information, or based on a combination of the first and second user's presence information). In like manner, the second user may also define his subscriptions using the same or similar sets of conditions to ensure that presence information is only received for elements/attributes of interest at times when these are relevant or meaningful to the second user (the watcher). This dynamic interaction between the published presence information and the subscription enables users of the presence system to interact much more efficiently than was heretofore possible using the rudimentary presence and rich presence technologies currently known in the art.

Furthermore, in one implementation of the novel presence system, each attribute (each element of presence information) is encrypted separately using a different key so that specific attributes can be shared individually and privately. Keys can be exchanged securely using Diffie-Hellman to one or more authorized watchers for each specific attribute for which an authorization has been granted. This represents a radically different privacy paradigm from what is proposed in RFC 3863 wherein presence information is instantiated as a single monolithic document. If a Presentity wants to apply privacy rules that result in a watcher being permitted to receive only a subset of the presence information then a new document must be created which does not contain private information. This requires filtering of the presence information to remove private data. Filtering would be required for each notification cycle and for each watcher, and then the entire presence document is sent to the watcher even if this contains potentially unneeded information. This is particularly inefficient for mobile clients. In contrast, the novel presence system described herein can encrypt each attribute separately and send only that attribute to the watcher while maintaining complete privacy for all other attributes.

Figure 34:
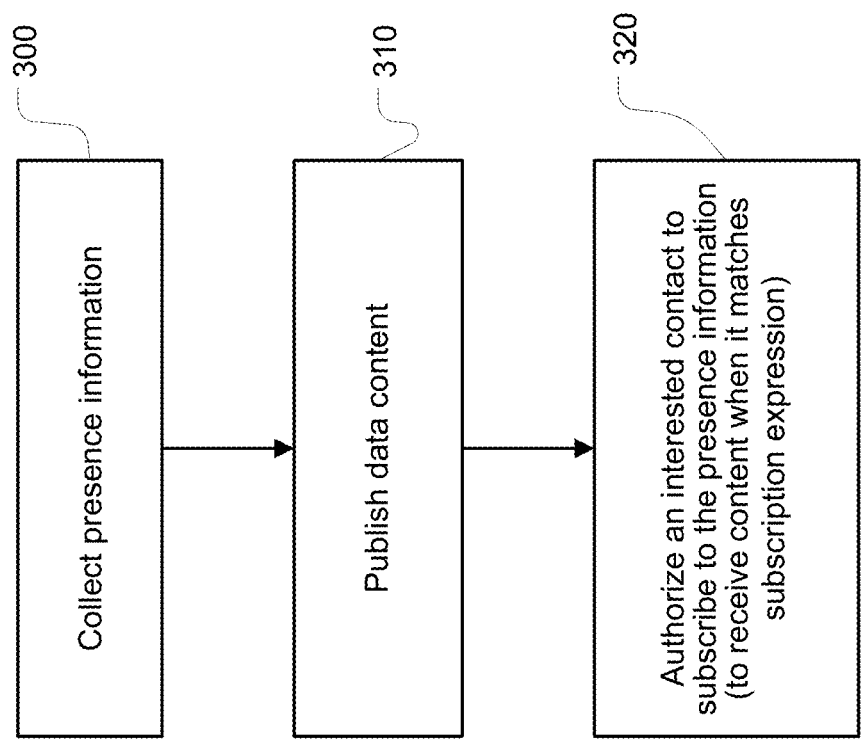
FIG. 34 is a flowchart depicting some of the main steps of a method of publishing presence information.

FIG. 34 is a flowchart depicting some of the main steps of a method of publishing presence information. This method of publishing presence information involves collecting presence information (step 300), publishing data content representing presence information to a content-based presence service, the presence service storing the data content in any arbitrary data format (step 310) and then authorizing an interested contact to subscribe to the presence information, thereby defining the contact as a watcher, the watcher receiving the data content representing the presence information when a subscription expression specified by the watcher matches the data content published to the presence service (step 320).

Figure 35:
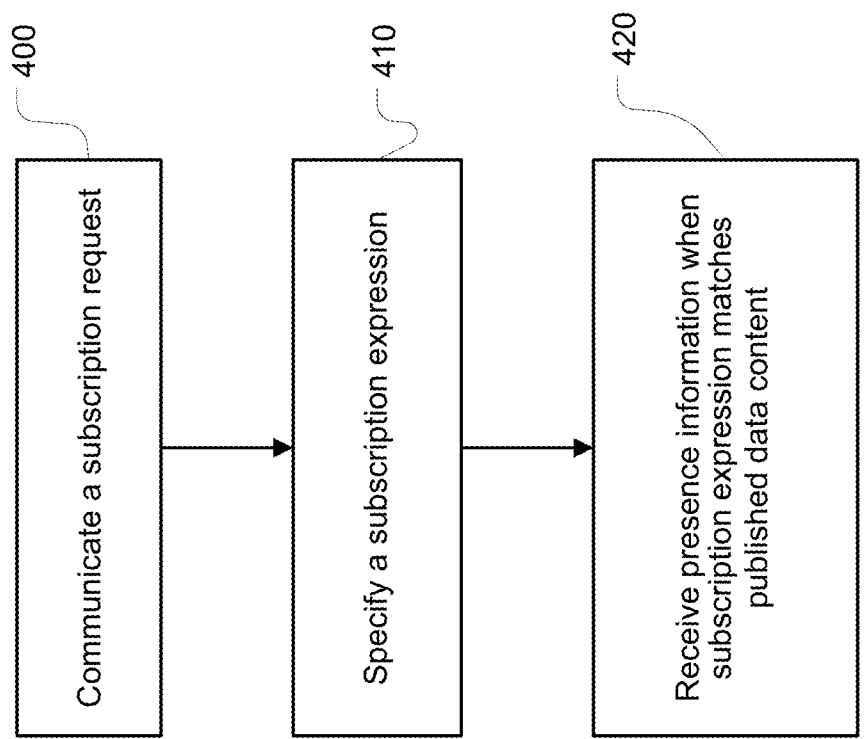
FIG. 35 is a flowchart depicting some of the main steps of a method of subscribing to presence information.

FIG. 35 is a flowchart depicting some of the main steps of a method of subscribing to presence information. As depicted, this method of subscribing to presence information involves a step 400 of communicating a subscription request to a content-based presence service, the subscription request being validated by the presence service provided that a first user publishing data content representing its presence information has authorized a second user communicating the subscription request to receive this presence information, a step 410 of specifying a subscription expression defining data content that is of interest to the second user, and a step 420 of receiving presence information about the first user when the subscription expression matches the data content published by the first user to the presence service.

Figure 36:
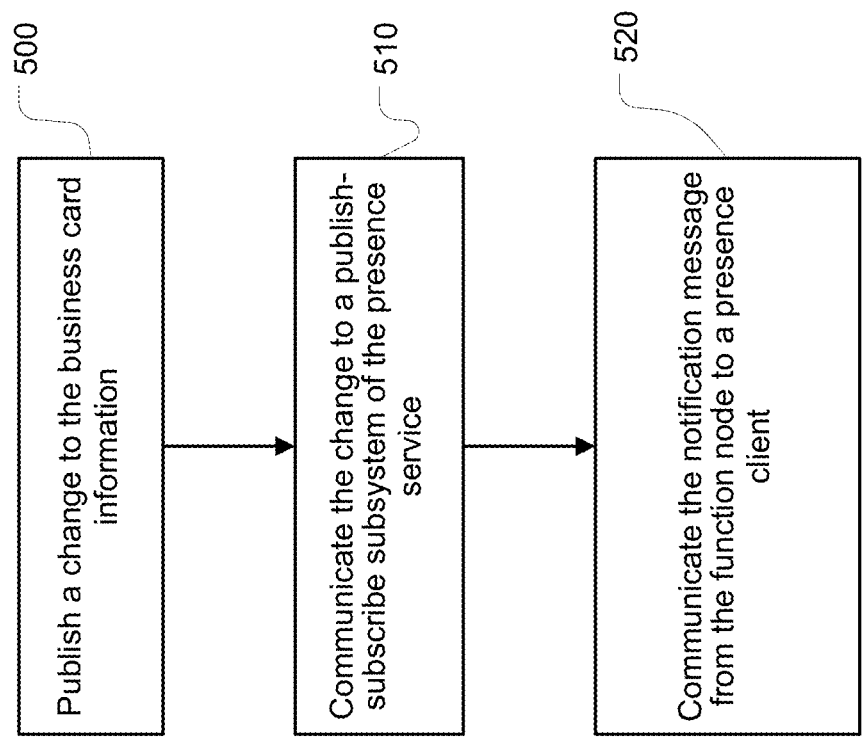
FIG. 36 is a flowchart depicting some of the main steps of a method of updating business card information.

FIG. 36 is a flowchart depicting some of the main steps of a method of updating business card information. This method of automatically updating business card information about a first user on a device associated with a second user involves a step 500 of publishing a change to the business card information by sending a message from a presence client associated with the first user via a proxy node of a presence service to a predetermined function node of the presence service that has already been bound to the presence client of the first user, a step 510 of communicating the change to a publish-subscribe subsystem of the presence service, the publish-subscribe subsystem determining that the second user has a subscription to the business card information of the first user and then notifying the function node of the change in a notification message, and a step 520 of communicating the notification message from the function node to a presence client associated with the second user via a predetermined proxy node.

The methods disclosed in the present specification can be implemented as coded instructions in a computer program product or computer readable medium. In other words, the computer program product or computer-readable medium stores software code to perform the foregoing methods when loaded into memory and executed on the microprocessor of one or more computing devices (e.g. servers).

This new technology has been described in terms of specific implementations and configurations which are intended to be exemplary only. The scope of the exclusive right sought by the Applicant is therefore intended to be limited solely by the appended claims.

The invention claimed is:

1. A method performed by a presence service comprising:
registering a user of a first device to map a universally unique identification (UUID) of the first device to the user;
receiving presence information, from the first device, in a data format that uses arbitrary descriptors;
storing the received presence information in a presence system in a data format using arbitrary descriptors;
receiving a subscription request from a second device to receive particular presence content of interest regarding the first device, the content of interest corresponding to only a portion of the presence information received from the first device, the subscription request including a subscription expression that identifies the particular presence information content of interest in a content-based format that is independent of the data formats with which the received presence information was received and stored and uses arbitrary descriptors wherein the content of interest is selected from current location, ability to communicate, availability to communicate, willingness to communicate, activity, holiday/working, sleeping/awake, mood, interests, intentions and wishes;
validating the subscription request by determining if information contained in the subscription request represents an authorized subscription relationship;
mediating, between the user of the first device and a user of the second device, an exchange of a cryptographic key that enables the presence information to be shared;
communicating a portion of the presence information to the second device based on the portion of the presence information matching the subscription expression; and
upon the user switching to a new first device, re-registering the user to map a UUID of the new first device to the user and update a profile of the user in a persistent data store.

2. The method as claimed in claim 1 wherein validating the request to subscribe to the presence information comprises determining which one or more of a plurality of elements of presence information are authorized by the subscription relationship.

3. The method as claimed in claim 1 further comprising receiving a message to pause a subscription to one or more elements of the presence information.

4. The method as claimed in claim 3 further comprising receiving a message to resume the subscription to the one or more elements of the presence information.

5. A non-transitory computer-readable medium comprising code which when loaded into memory and executed on a processor of a computing device is programmed to cause the device to perform acts of:
registering a user of a first device to map a universally unique identification (UUID) of the first device to the user;
receiving presence information, from the first device, in a data format that uses arbitrary descriptors;
storing the presence information in a data format that uses arbitrary descriptors;
receiving a subscription request, from a second device, to receive particular presence content of interest regarding the first device, the content of interest corresponding to only a portion of the presence information received from the first device, the subscription request including a subscription expression that identifies the particular presence information content of interest in a content-based format that is independent of the data formats with which the presence information was received and stored and uses arbitrary descriptors wherein the content of interest is selected from current location, ability to communicate, availability to communicate, willingness to communicate, activity, holiday/working, sleeping/awake, mood, interests, intentions and wishes;
validating the subscription request by determining if information contained in the subscription request represents an authorized subscription relationship;
mediating, between the user of the first device and a user of the second device, an exchange of a cryptographic key that enables the presence information to be shared
communicating a portion of the presence information to the second device based on the portion of the presence information matching the subscription expression; and
upon the user switching to a new first device, re-registering the user to map a UUID of the new first device to the user and update a profile of the user in a persistent data store.

6. The non-transitory computer readable medium as claimed in claim 5 wherein the code is further programmed to determine which one or more of a plurality of elements of presence information are authorized by the subscription relationship.

7. A presence system, comprising:
one or more proxy nodes for routing messages between a plurality of presence clients and one or more functional nodes, the one or more functional nodes processing the messages to direct each message to one of a plurality of application nodes; and
a publish-subscribe node, which is one of the plurality of application nodes, and which is configured to:
register a user of a first device to map a universally unique identification (UUID) of the first device to the user;
receive presence information, from a first presence client, in a data format that uses arbitrary descriptors,
store the presence information in a data format that uses arbitrary descriptors,
receive a subscription request, from a second presence client, to receive particular presence content of interest regarding the first device, the content of interest corresponding to only a portion of the presence information received from the first device, the subscription request including a subscription expression that identifies the particular presence information content of interest in a content-based format that is independent of the data formats with which the received presence information was received and stored and uses arbitrary descriptors, wherein the content of interest is selected from current location, ability to communicate, availability to communicate, willingness to communicate, activity, holiday/working, sleeping/awake, mood, interests, intentions and wishes;

validate the subscription request by determining if information contained in the subscription request represents an authorized subscription relationship, mediate, between the user of the first device and a user of the second device, an exchange of a cryptographic key that enables the presence information to be shared;

communicate a portion of the presence information to the second device based on the portion of the presence information matching the subscription expression; and upon the user switching to a new first device, re-register the user to map a UUID of the new first device to the user and update a profile of the user in a persistent data store.

8. The method of claim 1 wherein the subscription expression includes terms, relating to presence information, that are connected by a Boolean operator.

* * * * *